United States Patent
Yamagishi et al.

(10) Patent No.: US 7,339,620 B1
(45) Date of Patent: Mar. 4, 2008

(54) IMAGE SENSING APPARATUS HAVING A SIGNAL PROCESSING DEVICE THAT USES A SIGNAL IMAGED IN A NON-EXPOSURE STATE TO PROCESS A SIGNAL IN AN EXPOSURE STATE

(75) Inventors: Yoichi Yamagishi, Tokyo (JP); Makoto Hiramatsu, Ebina (JP); Keihiro Kurakata, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/437,965

(22) Filed: Nov. 10, 1999

(30) Foreign Application Priority Data

Nov. 11, 1998 (JP) ............................. 10-335043
Nov. 11, 1998 (JP) ............................. 10-335044

(51) Int. Cl.
  *H04N 9/64* (2006.01)
  *H04N 5/217* (2006.01)
  *H04N 5/225* (2006.01)
  *H04N 1/38* (2006.01)

(52) U.S. Cl. ................... 348/243; 348/220.1; 348/241; 358/463

(58) Field of Classification Search ............. 348/220.1, 348/241–243, 362, 618, 221.1; 358/463
See application file for complete search history.

(56) References Cited

U.S. PATENT DOCUMENTS

| 4,553,170 A | 11/1985 | Aoki et al. |
| 4,558,368 A | 12/1985 | Aoki et al. |
| 4,589,023 A | 5/1986 | Suzuki et al. |
| 5,729,288 A | 3/1998 | Saito ........................... 348/243 |
| 5,940,646 A | 8/1999 | Sato et al. |
| 6,046,771 A * | 4/2000 | Horii ........................... 348/243 |
| 6,061,092 A * | 5/2000 | Bakhle et al. ............... 348/243 |
| 6,084,634 A * | 7/2000 | Inagaki et al. .............. 348/294 |
| 6,144,408 A * | 11/2000 | MacLean .................... 348/241 |
| 6,563,536 B1 * | 5/2003 | Rashkovskiy et al. ...... 348/243 |
| 6,714,241 B2 * | 3/2004 | Baer ........................... 348/241 |

FOREIGN PATENT DOCUMENTS

JP 08-051571 2/1996

* cited by examiner

*Primary Examiner*—Lin Ye
*Assistant Examiner*—Dan Pasiewicz
(74) *Attorney, Agent, or Firm*—Morgan & Finnegan, LLP

(57) ABSTRACT

An apparatus has an image sensing device, and a signal processing device for performing a first image sensing operation for making the image sensing device perform an image sensing operation in an exposure state to obtain a sensed image signal, and a second image sensing operation for making the image sensing device perform an image sensing operation in a non-exposure state to obtain a sensed image signal, and processing the sensed image signal obtained by the first image sensing operation by the sensed image signal obtained by the second image sensing operation. The signal processing device determines in accordance with the image sensing time of the first image sensing operation whether or not the second image sensing operation is performed.

6 Claims, 19 Drawing Sheets

FIG. 18

| |
|---|
| DIRECTORY INFORMATION |
| IMAGE SENSING OPERATION PROCESS PROGRAM MODULE IN FIGS. 2, 3, AND 4 |
| DISTANCE MEASUREMENT / PHOTOMETRY PROCESS PROGRAM MODULE IN FIG. 5 |
| IMAGE SENSING PROCESS PROGRAM MODULE IN FIGS. 6, AND 7 |
| DARK CAPTURE PROCESS PROGRAM MODULE IN FIG. 8 |
| IMAGE SENSING OPERATION PROCESS PROGRAM MODULE IN FIGS. 10, 11, 12, AND 13 |
| ⋮ |

FIG. 19

| DIRECTORY INFORMATION |
|---|
| IMAGE SENSING OPERATION PROCESS PROGRAM MODULE IN FIGS. 15, AND 16 |
| DISTANCE MEASUREMENT / PHOTOMETRY PROCESS PROGRAM MODULE IN FIG. 5 |
| IMAGE SENSING PROCESS PROGRAM MODULE IN FIGS. 6, AND 7 |
| DARK CAPTURE PROCESS PROGRAM MODULE IN FIG. 8 |
| ⋮ |

IMAGE SENSING APPARATUS HAVING A SIGNAL PROCESSING DEVICE THAT USES A SIGNAL IMAGED IN A NON-EXPOSURE STATE TO PROCESS A SIGNAL IN AN EXPOSURE STATE

BACKGROUND OF THE INVENTION

1. Field of the Invention

The present invention relates to an image sensing apparatus for sensing a still image and/or moving image.

2. Description of the Related Art

Conventionally, image sensing apparatuses such as electronic cameras and the like, which record/play back still images and moving images sensed by a solid-state image sensing element such as a CCD or the like using memory cards having solid-state memory elements as recording media, have already been commercially available.

In an electronic camera using such solid-state image sensing element such as a CCD or the like, a dark noise correction process can be done by computations using dark image data which is read out after charge accumulation in the same manner as in actual image sensing while the image sensing element is not exposed, and actually sensed image data which is read out after charge accumulation while the image sensing element is exposed.

With this process, sensed image data can be corrected for image quality deterioration such as pixel omission or the like caused by dark current noise produced by the image sensing element and small scratches unique to the image sensing element, thus obtaining a high-quality sensed image.

Especially, since dark current noise increases with increasing charge accumulation time and temperature rise of the image sensing element, if exposure for a long period of time (seconds) or at high temperature is done, a great image quality improvement effect can be obtained, and the dark noise correction process is a function useful for the electronic camera users.

In this manner, since dark current noise increases with increasing charge accumulation time and temperature rise of the image sensing element, dark image data is re-captured using the charge accumulation time of the image sensing element in units of image sensing processes.

For this reason, when actual image sensing is done after dark image data is captured, the shutter release time lag becomes longer by the dark image sensing time, thus missing a shutter chance.

On the other hand, when dark image data is captured after actual image sensing, the image sensing interval between the first and second frames is prolonged by the dark image sensing time in the continuous shot mode. As a result, constant image sensing frame intervals cannot be set.

Furthermore, in either case, since the dark image capture process is repeated upon each image sensing, the consumption power increases accordingly.

SUMMARY OF THE INVENTION

One aspect of the present invention is to provide an apparatus, which comprises an image sensing device, and a signal processing device for performing a first image sensing operation for making the image sensing device perform an image sensing operation in an exposure state to obtain a sensed image signal, and a second image sensing operation for making the image sensing device perform an image sensing operation in a non-exposure state to obtain a sensed image signal, and processing the sensed image signal obtained by the first image sensing operation by the sensed image signal obtained by the second image sensing operation, the signal processing device determining in accordance with an image sensing time of the first image sensing operation whether or not the second image sensing operation is performed, whereby the apparatus can prevent a shutter chance from being missed, can set constant image sensing frame intervals, and can achieve power savings.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 18 and 19 show memory maps of a nonvolatile memory 56 as a storage medium.

DETAILED DESCRIPTION OF THE PREFERRED EMBODIMENTS

The preferred embodiments of an image sensing apparatus, image processing control method, and storage medium according to the present invention will be described hereinafter. The image sensing apparatus of this embodiment is applied to an electronic camera.

First Embodiment

Figure 1:
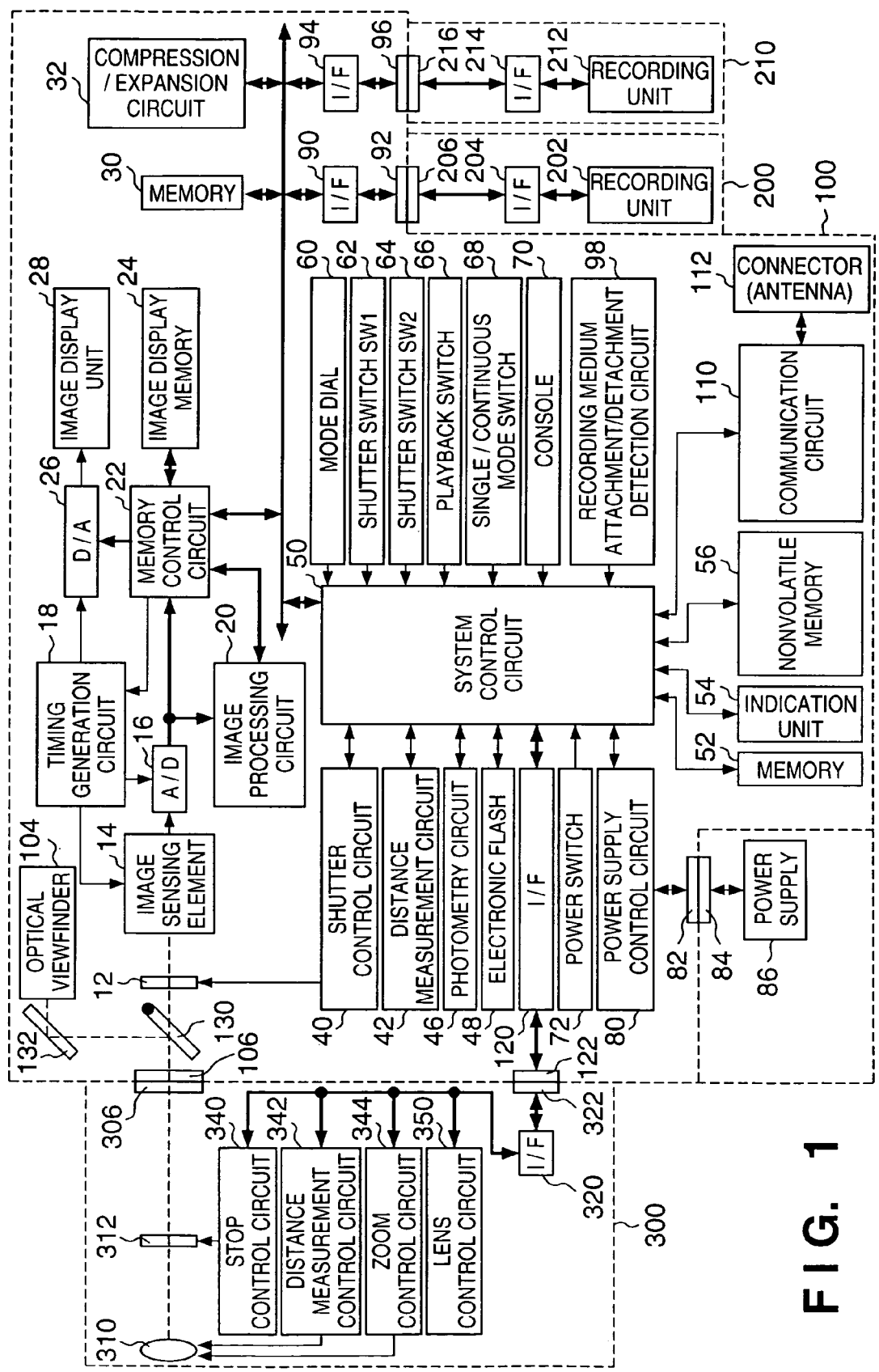
FIG. 1 is a block diagram showing the arrangement of an electronic camera according to the first embodiment of the present invention.

FIG. 1 is a block diagram showing the arrangement of an electronic camera according to the first embodiment of the present invention.

Referring to FIG. 1, reference numeral 100 denotes an image sensing apparatus. Reference numeral 12 denotes a shutter having a stop function of controlling the exposure amount on an image sensing element 14. Reference numeral 14 denotes an image sensing element for converting an optical image into an electrical signal.

Light rays that have entered a photographing lens 310 in a lens unit 300 are guided onto the image sensing element 14 via a stop 312, lens mounts 306 and 106, a mirror 130, and the shutter 12 by a single-lens reflex system, and form an optical image on the image sensing element 14.

Reference numeral 16 denotes an A/D converter for converting an analog signal output from the image sensing element 14 into a digital signal. Reference numeral 18 denotes a timing generation circuit for supplying clock signals and control signals to the image sensing element 14, the A/D converter 16, and a D/A converter 26. The timing generation circuit 18 is controlled by a memory control circuit 22 and system control circuit 50.

Reference numeral 20 denotes an image processing circuit for performing a predetermined pixel interpolation process and color conversion process for data from the A/D converter 16 or the memory control circuit 22. The image processing circuit 20 can execute a TTL (through the lens) AF (auto-focus) process, AE (auto-exposure) process, and EF (flash pre-emission) process. In these processes, the image processing circuit 20 makes predetermined computations using sensed image data as needed, and the system control circuit 50 controls an exposure (shutter) controller 40 and distance measurement circuit 42 on the basis of the obtained computation result. Also, the image processing circuit 20 makes predetermined computations using sensed image data, and executes a TTL AWB (auto white balance) process on the basis of the obtained computation result.

Since this embodiment comprises the distance measurement circuit 42 and a photometry circuit 46 dedicated to those processes, the AF, AE, and EF processes may be done using the distance measurement circuit 42 and photometry circuit 46 in place of those using the image processing circuit 20.

Alternatively, the AF, AE, and EF processes may be done using the distance measurement circuit 42 and photometry circuit 46 in addition to those using the image processing circuit 20.

Reference numeral 22 denotes a memory control circuit which controls the A/D converter 16, the timing generation circuit 18, the image processing circuit 20, an image display memory 24, the D/A converter 26, a memory 30, and a compression/expansion circuit 32.

Data output from the A/D converter 16 is written in the image display memory 24 or memory 30 via the image processing circuit 20 and memory control circuit 22 or directly via the memory control circuit 22.

Reference numeral 24 denotes an image display memory; and 26, a D/A converter. Reference numeral 28 denotes an image display unit comprising, e.g., a TFT LCD or the like. Display image data written in the image display memory 24 is displayed on the image display unit 28 via the D/A converter 26. When sensed image data is displayed using the image display unit 28 as needed, an electronic viewfinder function can be implemented. The image display unit 28 can arbitrarily turn on/off its display in accordance with an instruction from the system control circuit 50. When the display is OFF, great power savings of the image sensing apparatus 100 can be achieved.

Reference numeral 30 denotes a memory for storing sensed still or moving images. The memory 30 has a sufficient memory size capable of storing a predetermined number of still images or a moving image for a predetermined period of time. Hence, even in a continuous shot mode or panorama mode for continuously sensing a plurality of still images, a large number of images can be written in the memory 30 at high speed. Also, the memory 30 can be used as a work area of the system control circuit 50.

Reference numeral 32 denotes a compression/expansion circuit for compressing/expanding image data by the adaptive discrete cosine transform (ADCT) or the like. The compression/expansion circuit 32 loads an image stored in the memory 30, compresses or expands it, and writes the compressed or expanded data in the memory 30. These data are stored in a recording medium together with information upon capturing image data, e.g., information such as the photographing date, continuous-shot/panorama image sensing mode, and the like.

Reference numeral 40 denotes a shutter control circuit for controlling the shutter 12 on the basis of photometry information from the photometry circuit 46 in cooperation with a stop control circuit 340 that controls the stop 312. Reference numeral 42 denotes a distance measurement circuit used to execute the AF process. Light rays that have entered the photographing lens 310 in the lens unit 300 are guided to the distance measurement circuit 42 via the stop 312, the lens mounts 306 and 106, the mirror 130, and a distance measurement sub-mirror (not shown) by the single-lens reflex system, thus measuring the focusing state of an image formed as an optical image.

Reference numeral 46 denotes a photometry circuit used to execute the AE process. Light rays that have entered the photographing lens 310 in the lens unit 300 are guided to the photometry circuit 46 via the stop 312, the lens mounts 306 and 106, the mirror 130, and a photometry sub-mirror (not shown), thus measuring the exposure state of an image formed as an optical image. The photometry circuit 46 also has an EF process function in cooperation with an electronic flash 48. Reference numeral 48 denotes an electronic flash which has a function of projecting AF assist light, and a flash light control function.

Note that the system control circuit 50 can perform exposure control and AF control using a video TTL scheme for the exposure (shutter) controller 40, stop control circuit 340, and distance measurement control circuit 342 on the basis of the computation result of image data sensed by the image sensing element 14 by the image processing circuit 20.

Furthermore, AF control may be done using both the measurement result of the distance measurement circuit 42 and the computation result of image data sensed by the image sensing element 14 by the image processing circuit 20. Moreover, exposure control may be done using both the measurement result of the photometry circuit 46 and the computation result of image data sensed by the image sensing element 14 by the image processing circuit 20.

Reference numeral 50 denotes a system control circuit for controlling the overall image sensing apparatus 100. The system control circuit 50 incorporates a known CPU, and the like. Reference numeral 52 denotes a memory for storing constants, variables, programs, and the like required for operating the system control circuit 50. Reference numeral 54 denotes an indication unit which comprises a liquid crystal display device, loudspeaker, and the like, and indicates the operation state, messages, and the like using characters, images, sound, and the like in accordance with execution of programs in the system control circuit 50. The indication unit 54 is set at one or a plurality of easy-to-see positions around the console of the image sensing apparatus 100. The indication unit 54 is constructed by a combination of an LCD, LEDs, sound generation element, and the like. Some functions of the indication unit 54 are set within an optical viewfinder 104.

Of the indication contents of the indication unit 54, those displayed on the LCD or the like include a single/continuous shot indication, self timer indication, compression ratio indication, recording pixel count indicating, recorded image count indication, remaining recordable image count indication, shutter speed indication, aperture value indication, exposure correction indication, flash indication, red-eye suppression indication, macro image sensing indication, buzzer setup indication, remaining timepiece battery capacity indication, remaining battery capacity indication, error indication, information indication using numerals of a plurality of digits, attachment/detachment indication of recording media 200 and 210, communication I/F operation indication, date/time indication, connection indication with an external computer, and the like.

Of the indication contents of the indication unit 54, those displayed within the optical viewfinder 104 include in-focus indication, image sensing ready indication, camera shake alert indication, flash charging indication, flash charging completion indication, shutter speed indication, aperture value indication, exposure correction indication, recording medium write access indication, and the like.

Furthermore, of the indication contents of the indication unit 54, those displayed using the LEDs and the like include, e.g., in-focus indication, image sensing ready indication, camera shake alert indication, flash charging indication, flash charging completion indication, recording medium write access indication, macro image sensing setup notification, secondary battery charging state indication, and the like.

Of the indication contents of the indication unit 54, those indicated by lamps and the like include, e.g., a self timer notification lamp, and the like. The self timer notification lamp may be commonly used as AF assist light.

Reference numeral 56 denotes an electrically erasable/programmable nonvolatile memory which stores programs (to be described later) and the like, and uses, e.g., an EEPROM or the like. Reference numerals 60, 62, 64, 66, 68, and 70 denote operation units for inputting various operation instructions of a system control circuit 50. These operation units are constructed by one or a plurality of combinations of a switch, a dial, a touch panel, a pointer using line of sight detection, a voice recognition device, and the like. These operation units will be explained in detail below.

Reference numeral 60 denotes a mode dial switch which can selectively set one of various function image sensing modes: an automatic image sensing mode, programmed image sensing mode, shutter speed priority image sensing mode, aperture priority image sensing mode, manual image sensing mode, focal depth priority (depth) image sensing mode, portrait image sensing mode, landscape image sensing mode, macro image sensing mode, sport image sensing mode, night scene image sensing mode, panorama image sensing mode, and the like.

Reference numeral 62 denotes a shutter switch (SW1), which is turned on in the middle of operation of a shutter button (not shown), and instructs start of the AF process, AE process, AWB process, EF process, and the like.

Reference numeral 64 denotes a shutter switch (SW2), which is turned on upon completion of operation of the shutter button (not shown). The shutter switch (SW2) 64 instructs start of a series of processes including an exposure process for writing a signal read out from the image sensing element 14 as image data in the memory 30 via the A/D converter 16 and memory control circuit 22, a development process using computation results in the image processing circuit 20 and memory control circuit 22, and a recording process for reading out image data from the memory 30, compressing the readout data by the compression/expansion circuit 32, and writing the compressed image data in the recording medium-200 or 210.

Reference numeral 66 denotes a playback switch which instructs to start playback operation for reading out an image sensed in a given image sensing mode from the memory 30 or the recording medium 200 or 210, and displaying the readout image on the image display unit 28.

Reference numeral 68 denotes a single/continuous shot switch, which can set one of a single shot mode for sensing one frame of image upon depression of the shutter switch SW2, and then setting a standby state, and a continuous shot mode for successively sensing images while the shutter switch SW2 is held down.

Reference numeral 70 denotes a console including various buttons, touch panel, and the like, which include a menu button, set button, macro button, multi-frame playback new page button, flash setup button, single shot/continuous shot/self timer switch button, menu move + (plus) button, menu move − (minus) button, playback image move + (plus) button, playback image move − (minus) button, sensed image quality select button, exposure correct button, date/time setup button, select/change button that can select and change various functions upon executing image sensing and playback in, e.g., the panoramic mode, determine/execute button which can determine and execute various functions upon executing image sensing and playback in, e.g., the panoramic mode, image display ON/OFF switch for turning on/off the image display unit 28, quick review ON/OFF setup switch for setting a quick review function of automatically playing back sensed image data immediately after image sensing, compression mode switch for selecting a compression ratio of JPEG compression, and selecting a CCDRAW mode for directly converting a signal output from the image sensing element into digital data, and recording the digital data in a recording medium, playback mode switch for setting various function modes such as a playback mode, multi-frame playback/delete mode, PC connect mode, and the like, AF mode setup switch which can set a one-shot AE mode for starting auto-focusing upon depression of the shutter switch SW1, and maintaining an in-focus state once it is attained, and a servo AF mode for continuously executing auto-focusing while the shutter switch SW1 is held down, and the like.

In place of the plus and minus buttons, a rotary dial switch may be used to select numerical values and functions more smoothly.

Reference numeral 72 denotes a power switch which can selectively set power-ON and power-OFF modes of the image sensing apparatus 100. Also, the power switch 72 can also selectively set power-ON and power-OFF modes of various accessories such as the lens unit 300, external electronic flash, recording media 200 and 210, and the like, which are connected to the image sensing apparatus 100.

Reference numeral 80 denotes a power supply control circuit which is comprised of a battery detection circuit, a DC-DC converter, a switch circuit for switching a block to be energized, and the like. The power supply control circuit 80 detects the presence/absence, type, and remaining battery amount of a battery attached, controls the DC-DC converter on the basis of such detection results and an instruction from the system control circuit 50, and supplies a required voltage to the respective units including the recording media for a required period of time.

Reference numerals 82 and 84 denote connectors; and 86, a power supply unit, which includes a primary battery such as an alkali battery, lithium battery, or the like, a secondary battery such as an NiCd battery, NiMH battery, Li battery, or the like, an AC adapter, and the like.

Reference numerals 90 and 94 denote interfaces with recording media such as a memory card, hard disk, and the like; 92 and 96, connectors for connecting recording media such as a memory card, hard disk, and the like; and 98, a recording medium attachment/detachment detection circuit for detecting whether or not the recording medium 200 or 210 is attached to the connector 92 and/or the connector 96.

Note that this embodiment has two sets of interfaces and connectors that receive the recording media. However, one or an arbitrary number of sets of interfaces and connectors that receive the recording media may be equipped. As interfaces and connectors of different standards, those complying with the standards of a PCMCIA card, CF (compact flash) card, and the like may be used.

Furthermore, when the interfaces 90 and 94, and connectors 92 and 96 use those complying with the standards of a PCMCIA card, CF (compact flash) card, and the like, and various communication cards such as a LAN card, modem card, USB card, IEEE1394 card, P1284 card, SCSI card, PHS, and the like are connected thereto, image data and associated management information can be transferred between the image sensing apparatus and an external computer or its peripheral devices such as a printer and the like.

Reference numeral 104 denotes an optical viewfinder which can guide light rays that have entered the photographing lens 310 via the stop 312, the lens mounts 306 and 106, and the mirror 130 and a mirror 132 by the single-lens reflex system, and can form and display them as an optical image. In this manner, without using the electronic viewfinder function implemented by the image display unit 28, image sensing can be done using the optical viewfinder 104 alone. In the optical viewfinder 104, some functions of the indication unit 54, e.g., an in-focus indication, camera shake alert indication, flash charging indication, shutter speed indication, aperture value indication, exposure correction indication, and the like are provided.

Reference numeral 110 denotes a communication unit having various communication functions such as RS232C, USB, IEEE1394, P1284, SCSI, modem, LAN, radio communication, and the like. Reference numeral 112 denotes a connector or antenna, which serves as a connector when the image sensing apparatus 100 is connected to another device using the communication unit 110, or serves as an antenna in case of radio communications.

Reference numeral 120 denotes an interface for connecting the image sensing apparatus 100 to the lens unit 300 in the lens mount 106; 122, a connector for electrically connecting the image sensing apparatus 100 to the lens unit 300; and, a lens attachment/detachment detector (not shown) for detecting whether or not the lens unit 300 is attached to the lens mount 106 and/or the connector 122.

The connector 122 also has a function of exchanging control signals, status signals, data signals, and the like between the image sensing apparatus 100 and lens unit 300, and supplying currents of various voltages. The connector 122 may communicate not only electrical signals but also optical signals, audio signals, and the like.

Reference numerals 130 and 132 denote mirrors which can guide light rays that have entered the photographing lens 310 to the optical viewfinder 104 by the single-lens reflex system. Note that the mirror 132 may be either a quick return mirror or half mirror.

Reference numeral 200 denotes a recording medium such as a memory card, hard disk, or the like. The recording medium 200 comprises a recording unit 202 comprised of a semiconductor memory, magnetic disk, or the like, an interface 204 with the image sensing apparatus 100, and a connector 206 for connecting the image sensing apparatus 100. Reference numeral 210 denotes a recording medium such as a memory card, hard disk, or the like as in the recording medium 200. The recording medium 210 comprises a recording unit 212 comprised of a semiconductor memory, magnetic disk, or the like, an interface 214 with the image sensing apparatus 100, and a connector 216 for connecting the image sensing apparatus 100.

Reference numeral 300 denotes an exchangeable lens type lens unit. Reference numeral 306 denotes a lens mount for mechanically coupling the lens unit 300 to the image sensing apparatus 100. The lens mount 306 includes various functions of electrically connecting the lens unit 300 and image sensing apparatus 100.

Reference numeral 310 denotes a photographing lens; and 312, a stop. Reference numeral 320 denotes an interface for connecting the lens unit 300 to the image sensing apparatus 100 in the lens mount 306; and 322, a connector for electrically connecting the lens unit 300 to the image sensing apparatus 100.

The connector 322 also has a function of exchanging control signals, status signals, data signals, and the like between the image sensing apparatus 100 and lens unit 300, and receiving or supplying currents of various voltages. Note that the connector 322 may communicate not only electrical signals but also optical signals, audio signals, and the like.

Reference numeral 340 denotes a stop control circuit for controlling the stop 312 on the basis of photometry information from the photometry circuit 46 in cooperation with the shutter control circuit 40 that controls the shutter 12. Reference numeral 342 denotes a distance measurement control circuit for controlling focusing of the photographing lens 310; and 344, a zoom control circuit for controlling zooming of the photographing lens 310. Reference numeral 350 denotes a lens system control circuit for controlling the overall lens unit 300. The lens system control circuit 350 has a memory function of storing constants, variables, programs, and the like required for operating the lens unit 300, and a nonvolatile memory function of holding identification information such as a number or the like unique to the lens unit 300, management information, function information such as a full-aperture value, minimum aperture value, focal length, and the like, current and past setup values, and the like.

Figure 2:
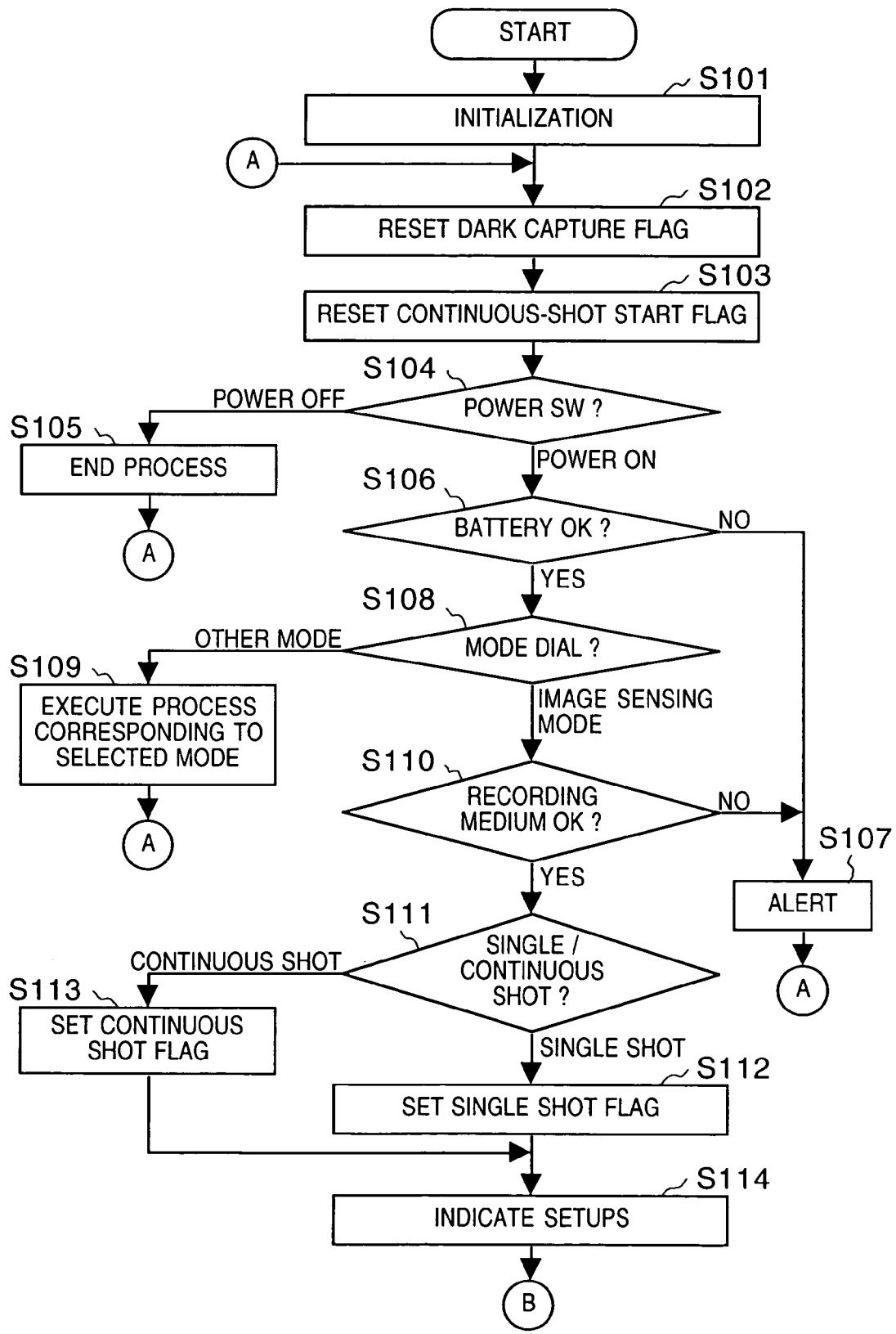
FIG. 2 is a flow chart showing the image sensing operation process sequence of an image sensing apparatus 100.
Figure 3:
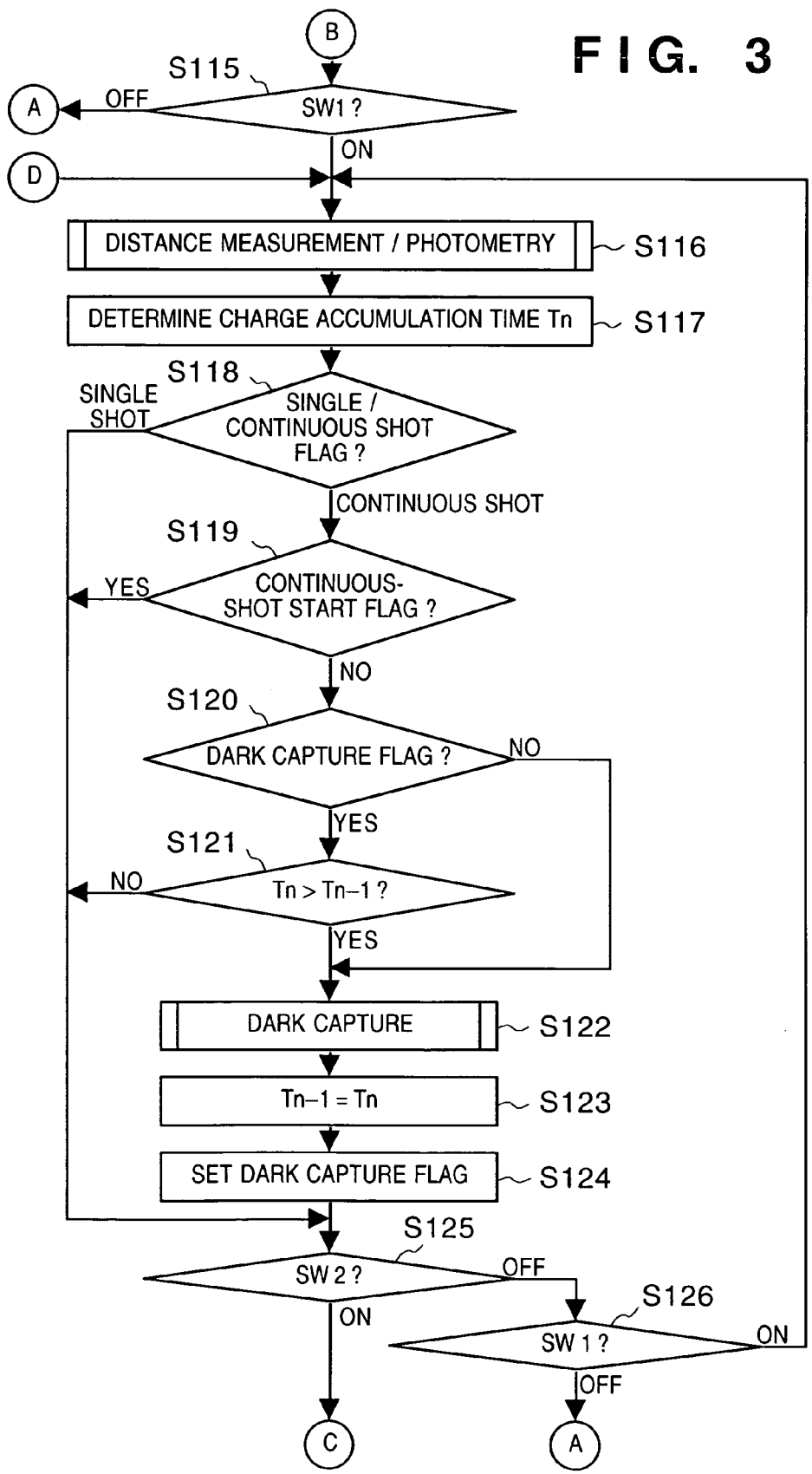
FIG. 3 is a flow chart showing the image sensing operation process sequence of the image sensing apparatus 100 and continued from FIG. 2.
Figure 4:
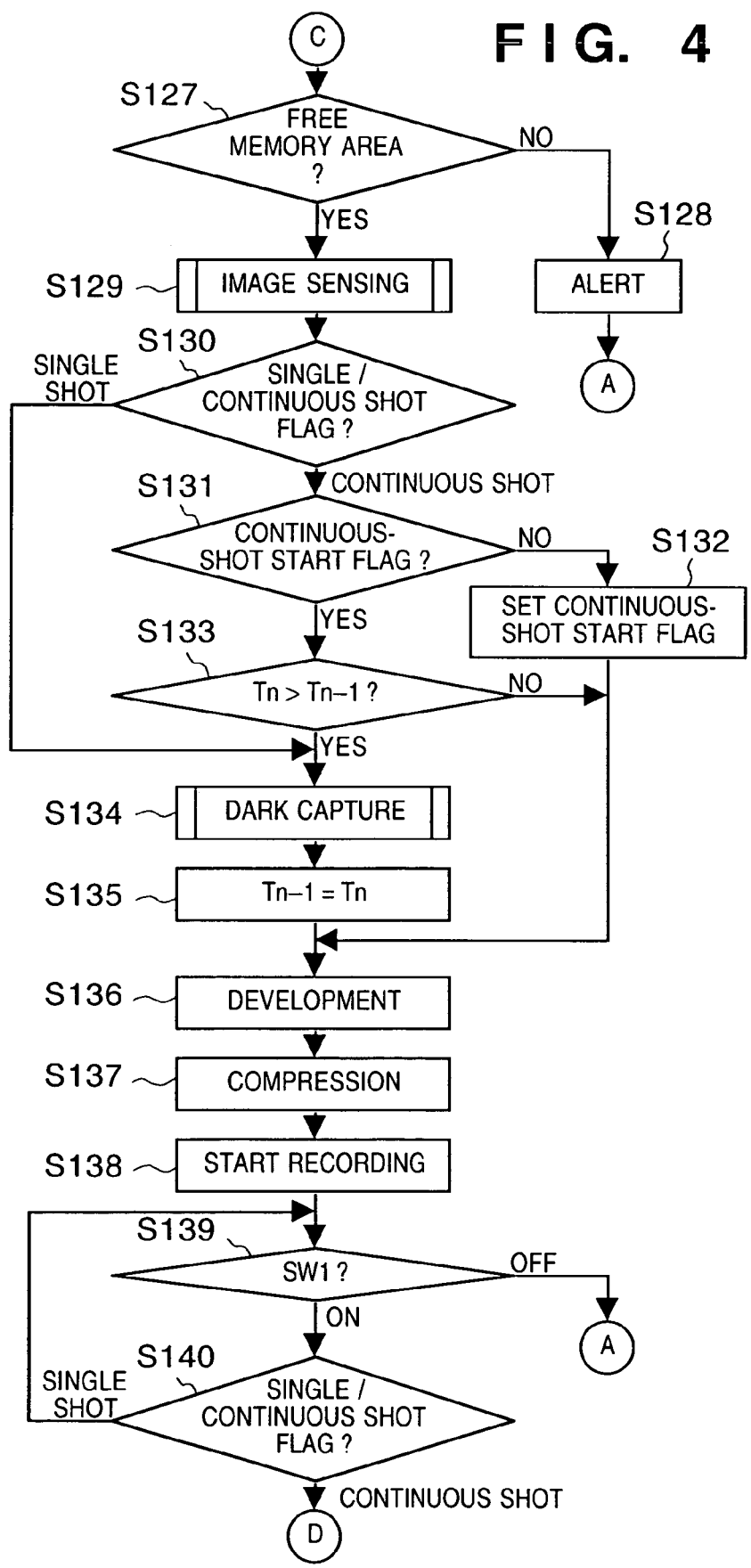
FIG. 4 is a flow chart showing the image sensing operation process sequence of the image sensing apparatus 100 and continued from FIGS. 2 and 3.

The operation of the electronic camera with the above arrangement will be explained below. FIGS. 2, 3, and 4 are flow charts showing the image sensing operation process sequence of the image sensing apparatus 100. This processing program is stored in a storage medium such as the nonvolatile memory 56, is loaded onto the memory 52, and is executed by the CPU in the system control circuit 50.

Upon power ON after battery exchange or the like, the system control circuit 50 initializes flags, control variables, and the like and also performs required predetermined initial setups in the respective units of the image sensing apparatus 100 (step S101). Furthermore, the system control circuit 50 resets a dark capture flag and continuous-shot start flag stored in its internal memory or the memory 52 (steps S102 and S103).

The system control circuit 50 checks the setup position of the power switch 72 to determine if the power switch 72 is set at the power-OFF position (step S104). If the power switch 72 is set at the power-OFF position, the system control circuit 50 executes a predetermined end process (step S105). More specifically, the system control circuit 50 changes the indications of the respective indication units to an end state, records required parameters and setup values including flags, control variables, and the like, and the currently selected mode in the nonvolatile memory 56, cuts off unnecessary power supply to the respective units of the image sensing apparatus 100 including the image display unit 28 by the power supply control circuit 80, and so forth. After that, the flow returns to step S102.

If the power switch 72 is set at the power-ON position, the system control circuit 50 checks using the power supply control circuit 80 if the remaining capacity and operation state of the power supply 86 comprising batteries and the like pose any problem in the operation of the image sensing apparatus 100 (step S106). If any problem is found, a predetermined alert indication is made by means of an image or voice using the indication unit 54 (step S107), and the flow then returns to step S102.

If no problem is found in the power supply 86, the system control circuit 50 checks the setup position of the mode dial switch 60 to determine if the mode dial switch 60 is set at one of the image sensing mode positions (step S108). If the mode dial switch 60 is set at any of other mode positions, the system control circuit 50 executes a process corresponding to the selected mode (step S109), and the flow returns to step S102 upon completion of the process.

On the other hand, if the mode dial switch 60 is set at one of the image sensing mode positions, the system control circuit 50 checks if the recording medium 200 or 210 is attached, acquires management information of image data recorded on the recording medium 200 or 210, and then checks if the operation state of the recording medium 200 or 210 poses any problem in the operation of the image sensing apparatus 100, in particular, recording/playback of image data to/from the recording medium 200 or 210 (step S110). If any problem is found, a predetermined alert indication is made by means of an image or voice using the indication unit 54 (step S107), and the flow then returns to step S102.

If no problem is found in step S110, the system control circuit 50 checks the setup state of the single/continuous shot switch 68 that sets the single/continuous shot mode (step S111). If the single shot mode is selected, the circuit 50 sets a single/continuous shot flag to indicate the single shot mode (step S112); if the continuous shot mode is selected, the circuit 50 sets the single/continuous shot flag to indicate the continuous shot mode (step S113). With the single/continuous shot switch 68, the single shot mode for sensing one frame of image upon depression of the shutter switch SW2, and then setting a standby state, and the continuous shot mode for successively sensing images while the shutter switch SW2 is held down can be arbitrarily selectively set. Note that the state of the single/continuous shot flag is stored in the internal memory of the system control circuit 50 or the memory 52.

The system control circuit 50 indicates various setup states of the image display apparatus 100 by means of an image or voice using the indication unit 54 (step S114). When the image display of the image display unit 28 is ON, various setup states of the image display apparatus 100 are indicated by means of an image also using the image display unit 28.

The system control circuit 50 checks if the shutter switch SW1 is ON (step S115). If the shutter switch SW1 is OFF, the flow returns to step S102. On the other hand, if the shutter switch SW1 is ON, the system control circuit 50 executes a distance measurement/photometry process (step S116). More specifically, the system control circuit 50 executes a distance measurement process for bringing the photographing lens 310 into focus on an object, and also executes a photometry process to determine the aperture value and shutter speed. In the photometry process, the electronic flash is set if necessary. The distance measurement/photometry process will be described in detail later.

The system control circuit 50 determines the aperture value (Av value) and shutter speed (Tv value) on the basis of the stored photometry data and/or setup parameters, and the image sensing mode selected by the mode dial switch 60, determines a charge accumulation time Tn in accordance with the determined shutter speed (Tv value), and stores the determined values in its internal memory or the memory 52 (step S117).

The system control circuit 50 checks the state of the single/continuous shot flag stored in its internal memory or the memory 52 (step S118). If the single shot mode is set, the flow jumps to step S125 to check the state of the shutter switch SW2.

In this manner, if it is determined in step S118 that the single shot mode is selected, since the flow jumps to step S125 without executing a dark capture process in step S122 (to be described later), the release time lag upon depression of the shutter switch SW2 in step S125 can be reduced.

On the other hand, if it is determined in step S118 that the continuous shot mode is selected, the system control circuit 50 checks the state of the continuous-shot start flag stored in its internal memory or the memory 52 (step S119). If the continuous-shot start flag is set, the flow then jumps to step S125.

In this manner, if it is determined in step S119 that the continuous-shot start flag is set, since the flow jumps to step S125 without executing the dark capture process in step S122, the dark capture process is done in step S134 as needed after the next frame of image is sensed in the process in step S129, once continuous shot image sensing has started.

With this process, during continuous shot image sensing, priority is given to image sensing timing over the dark capture process, and the shutter release time lag can be reduced.

On the other hand, if it is determined in step S119 that the continuous-shot start flag is reset, the system control circuit 50 checks the state of the dark capture flag stored in its internal memory or the memory 52 (step S120). If the dark capture flag is reset, the flow jumps to step S122.

On the other hand, if it is determined in step S1120 that the dark capture flag is set, the system control circuit 50 checks if the new charge accumulation time Tn that was determined in step S117 and stored in its internal memory or the memory 52 is greater than the previous charge accumulation time Tn−1 (step S121). If Tn≦Tn−1, the flow jumps to step S125.

That is, if the newly determined charge accumulation time Tn is equal to or shorter than the previously used charge accumulation time Tn−1, since a dark image correction process can be done using the already captured dark image data in a development process in step S136, another dark capture process in step S122 is skipped.

On the other hand, if it is determined in step S121 that Tn>Tn−1, i.e., if the newly determined charge accumulation time Tn is longer than the previously used charge accumulation time Tn−1, the dark capture process is redone using the new charge accumulation time Tn (step S122). In the dark capture process, the system control circuit 50 accumulates noise components such as dark current and the like of the image sensing element 14 for the same period of time as that required for actual image sensing, while closing the shutter 12, and reads out the accumulated noise image signal.

By making correction computations using dark image data captured by the dark capture process, sensed image data can be corrected for image quality deterioration such as pixel omission or the like caused by dark current noise produced by the image sensing element 14 and scratches unique to the image sensing element 14. The dark capture process will be described in detail later.

In this fashion, if the continuous shot mode is set in step S118, continuous shot image sensing has not started yet by pressing the shutter switch SW2, and no dark capture process is made after the shutter switch SW1 has been pressed, or if the dark capture process is made after the shutter switch SW1 has been pressed, but it is determined that the image sensing condition has changed due to a change in charge accumulation time Tn, and the dark capture process is redone, the dark capture process is executed prior to continuous shot image sensing, and nearly constant continuous shot frame intervals can be set, unless the dark capture process must be redone during continuous shot image sensing upon executing continuous shot image sensing by pressing the shutter switch SW2 in step S125.

Upon completion of the dark capture process in step S122, the system control circuit 50 updates Tn−1 by replacing it by Tn (Tn−1=Tn) so as to store the currently used charge accumulation time Tn as Tn−1 indicating the previously used charge accumulation time (step S123), and sets and stores the dark capture flag in its internal memory or the memory 52 (step S124).

The system control circuit 50 checks if the shutter switch SW2 is ON (step S125). If the shutter switch SW2 is OFF, the system control circuit 50 checks if the shutter switch SW1 is ON (step S126). If the shutter switch SW1 is ON, the flow returns to step S116 to repeat a series of processes. On the other hand, if the shutter switch SW1 is turned off in step S126, the flow returns to step S102.

On the other hand, if it is determined in step S125 that the shutter switch SW2 is turned on, the system control circuit 50 checks if an area that can store sensed image data is available on an image storage buffer area on the memory 30 (step S127). If no area that can store sensed image data is available on the image storage buffer area on the memory 30, a predetermined alert indication is made by means of an image or voice using the indication unit 54 (step S128), and the flow then returns to step S102.

For example, the user experiences such state immediately after he or she has executed continuous shot image sensing corresponding to a maximum number of images that can be stored in the image storage buffer area. In this state, the first image to be read out from the memory 30 and written in the recording medium 200 or 210 is not recorded on the recording medium 200 or 210 yet, and a free area even for one image cannot be assured on the image storage buffer area on the memory 30.

When sensed image data is stored in the image storage buffer area on the memory 30 after it is compressed, it is checked in step S127 if an area that can store sensed image data is available on the image storage buffer area on the memory 30, in consideration of the fact that the compressed image data size varies depending on the setups of the compression mode.

If an area that can store sensed image data is available on the image storage buffer area on the memory 30, the system control circuit 50 executes an image sensing process (step S129). More specifically, the system control circuit 50 reads out a sensed image signal, which has been accumulated for a predetermined period of time upon image sensing, from the image sensing element 14, and writes the sensed image data on the predetermined area of the memory 30 via the A/D converter 16, image processing circuit 20, and memory control circuit 22, or from the A/D converter directly via the memory control circuit 22. The image sensing process will be explained in detail later.

Upon completion of the image sensing process, the system control circuit 50 checks the state of the single/continuous shot flag stored in its internal memory or the memory 52 (step S130). As a result of checking the state of the single/continuous shot flag, if the single shot mode is selected, the system control circuit 50 executes a dark capture process (step S134).

In this manner, if it is determined in step S130 that the single shot mode is selected, the system control circuit 50 executes the dark capture process after the image sensing process, so as to reduce the release time lag upon depression of the shutter switch SW2.

On the other hand, as a result of checking the state of the single/continuous shot flag in step S130, if the continuous shot mode is selected, the system control circuit 50 checks the state of the continuous-shot start flag stored in its internal memory or the memory 52 (step S131).

If the continuous-shot start flag is reset, the system control circuit 50 sets the continuous-shot start flag (step S132).

In this manner, if the continuous-shot start flag is reset, since dark image data required for the development process in step S136 has already been captured in the dark capture process in step S122, the second frame of continuous shot image sensing is sensed without executing the dark capture process in step S134 after the first frame is sensed in step S129 upon starting continuous shot image sensing.

With this control, the continuous shot frame interval between the first and second frames upon continuous shot image sensing can be shortened, and the shutter release time lag for the second frame can be reduced.

On the other hand, if it is determined in step S131 that the continuous-shot start flag is set, the system control circuit 50 checks if the new charge accumulation time Tn that was determined in step S117 and stored in its internal memory or the memory 52 is greater than the previous charge accumulation time Tn−1 (step S133). If Tn≦Tn−1, the flow jumps to step S136.

That is, if the newly determined charge accumulation time Tn is equal to or shorter than the previously used charge accumulation time Tn−1, since a dark image correction process can be done using the already captured dark image data in a development process in step S136, another dark capture process in step S134 is skipped.

In this manner, if the continuous shot mode is set in step S130, and the second and subsequent frames of continuous shot image sensing are sensed while the shutter switch SW2 is held ON, the shutter release time lag for the second and subsequent frames can be reduced unless the dark capture process must be redone. On the other hand, if it is determined in step S133 that Tn>Tn−1, i.e., if the newly determined charge accumulation time Tn is longer than the previously used charge accumulation time Tn−1, a new charge accumulation time Tn is set to redo the dark capture process in step S134.

That is, if the continuous shot mode is set in step S130, and the second and subsequent frames of continuous shot image sensing are sensed while the shutter switch SW2 is held ON, the dark capture process is done in step S134 only when the dark capture process has already been done but must be redone since it is determined that the image sensing condition has changed due to a change in charge accumulation time Tn.

In this way, when a constant exposure value of an object is maintained during continuous shot image sensing, the dark capture process need not be redone during continuous shot image sensing, and nearly constant continuous shot frame intervals can be set.

In step S134, the system control circuit 50 executes the dark capture process for accumulating noise components such as dark current and the like of the image sensing element 14 for the same period of time as that required for actual image sensing, while closing the shutter 12, and reading out the accumulated noise image signal.

By making correction computations using dark image data captured by the dark capture process, sensed image data can be corrected for image quality deterioration such as pixel omission or the like caused by dark current noise produced by the image sensing element 14 and scratches unique to the image sensing element 14. The dark capture process will be described in detail later.

Upon completion of the dark capture process, the system control circuit 50 updates Tn−1 by replacing it by Tn (Tn−1=Tn) so as to store the currently used charge accumulation time Tn as Tn−1 indicating the previously used charge accumulation time (step S135).

The system control circuit 50 reads out some of image data written in the predetermined area of the memory 30 via the memory control circuit 22, executes a WB (white balance) integral computation process and OB (optical black) integral computation process required to execute development processes, and stores the computation results in its internal memory or the memory 52.

The system control circuit 50 then reads out sensed image data written in the predetermined area of the memory 30 using the memory control circuit 22 and the image processing circuit 20 as needed, and executes various development processes including AWB (auto white balance) process, gamma conversion, color conversion, and the like using the computation results stored in its internal memory or the memory 52 (step S136).

In the development processes in step S136, the system control circuit 50 also executes a dark correction computation process for canceling dark current noise and the like of the image sensing element 14 by executing a subtraction process using the dark image data captured in the dark capture process.

The system control circuit 50 reads out image data written in the predetermined area of the memory 30, makes the compression/expansion circuit 32 execute an image compression process in accordance with the selected mode, and writes the image data that has sensed and undergone a series of processes in a free image space of the image storage buffer area on the memory 30 (step S137).

Upon executing a series of processes, the system control circuit 50 starts a recording process for reading out image data stored in the image storage buffer area of the memory 30, and writing the readout image data in the recording medium 200 or 210 such as a memory card, compact flash card, or the like (step S138).

This recording process is started for new image data, which has been sensed and undergone a series of processes, every time that image data is written in a free image space of the image storage buffer area on the memory 30.

While a write of image data in the recording medium 200 or 210 is underway, a recording medium write access indication (e.g., flashing an LED of the indication unit 54) is made to clearly indicate that write access.

The system control circuit 50 then checks if the shutter switch SW1 is ON (step S139). If the shutter switch SW1 stays OFF, the flow returns to step S102. If the shutter switch SW1 is ON, the system control circuit 50 checks the state of the single/continuous shot flag stored in its internal memory or the memory 52 (step S140), and if the single shot mode is selected, the flow returns to step S139 to repeat the current process until the shutter switch SW1 is turned off.

If the continuous shot mode is selected, the flow returns to step S116 to proceed with image sensing, thus repeating a series of processes.

Figure 5:
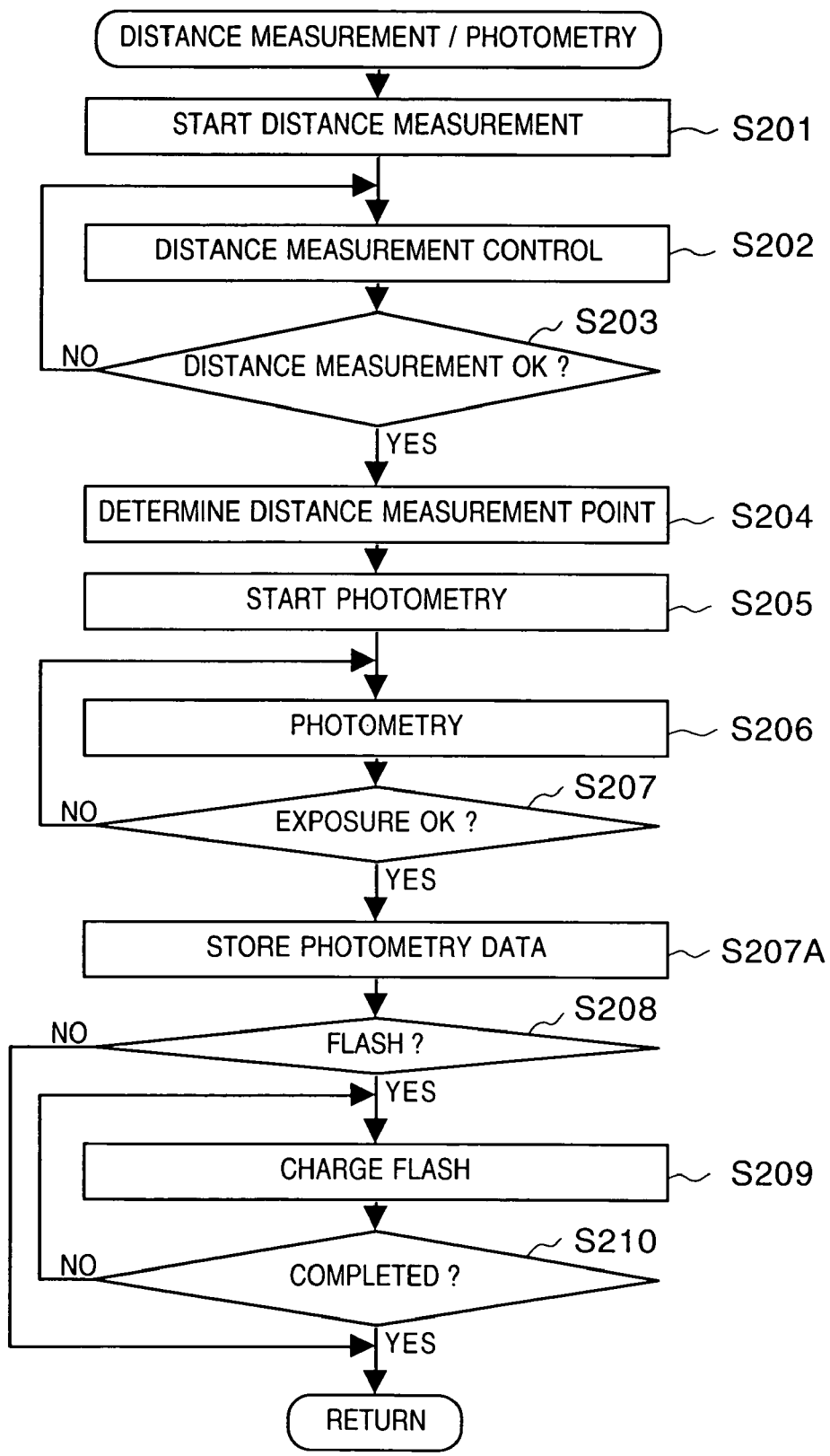
FIG. 5 is a flow chart showing the distance measurement/photometry process sequence in step S116.

FIG. 5 is a flow chart showing the distance measurement/photometry process in step S116. In the distance measurement/photometry process, the system control circuit 50 and the stop control circuit 340 or distance measurement control circuit 342 exchange various signals via the interface 120, connectors 122 and 322, interface 320, and lens control circuit 350.

The system control circuit 50 starts an AF (auto-focus) process using the image sensing element 14, and distance measurement circuits 42 and 342 (step S201).

The system control circuit 50 executes AF control for checking the focusing state of an image formed as an optical image by guiding light rays, which have entered the photographing lens 310, to the distance measurement circuit 42 via the stop 312, lens mounts 306 and 106, mirror 130, and distance measurement sub-mirror (not shown), and detecting the focusing state using the distance measurement circuit 42 while driving the photographing lens 310 using the distance measurement control circuit 342, until the distance measurement (AF) result indicates an in-focus (steps S202 and S203).

If the distance measurement (AF) result indicates an in-focus, the system control circuit 50 determines an in-focus distance measurement point from those in an image sensing screen, and stores distance measurement data and/or setup parameters in its internal memory or the memory 52 together with the determined distance measurement point data (step S204).

Subsequently, the system control circuit 50 starts an AE (auto-exposure) process using the photometry circuit 46 (step S205). The system control circuit 50 executes a photometry process using the exposure (shutter) controller 40 for measuring the exposure state of an image formed as an optical image by guiding light rays, which have entered the photographing lens 310, to the photometry circuit 46 via the stop 312, lens mounts 306 and 106, mirrors 130 and 132, and photometry lens (not shown), until it is determined that the exposure (AE) value is appropriate (steps S206 and S207).

If it is determined in step S207 that the exposure (AE) value is appropriate, the system control circuit 50 stores photometry data and/or setup parameters in its internal memory or the memory 52 (step S207A).

Note that the system control circuit 50 determines the aperture value (Av value) and shutter speed (Tv value) in accordance with the exposure (AE) result detected by the photometry process in step S206 and the image sensing mode selected by the mode dial switch 60.

The system control circuit 50 determines the charge accumulation time of the image sensing element 14 in accordance with the determined shutter speed (Tv value), and executes the image sensing process and dark capture process using an equal charge accumulation time.

The system control circuit 50 checks in accordance with the photometry data obtained in the photometry process in step S206 if the electronic flash need be operated (step S208). If the electronic flash need be operated, a flash flag is set and the electronic flash 48 is charged to its full capacity (steps S209 and S210). When the electronic flash 48 is completely charged, the process returns to the main routine.

Figure 6:
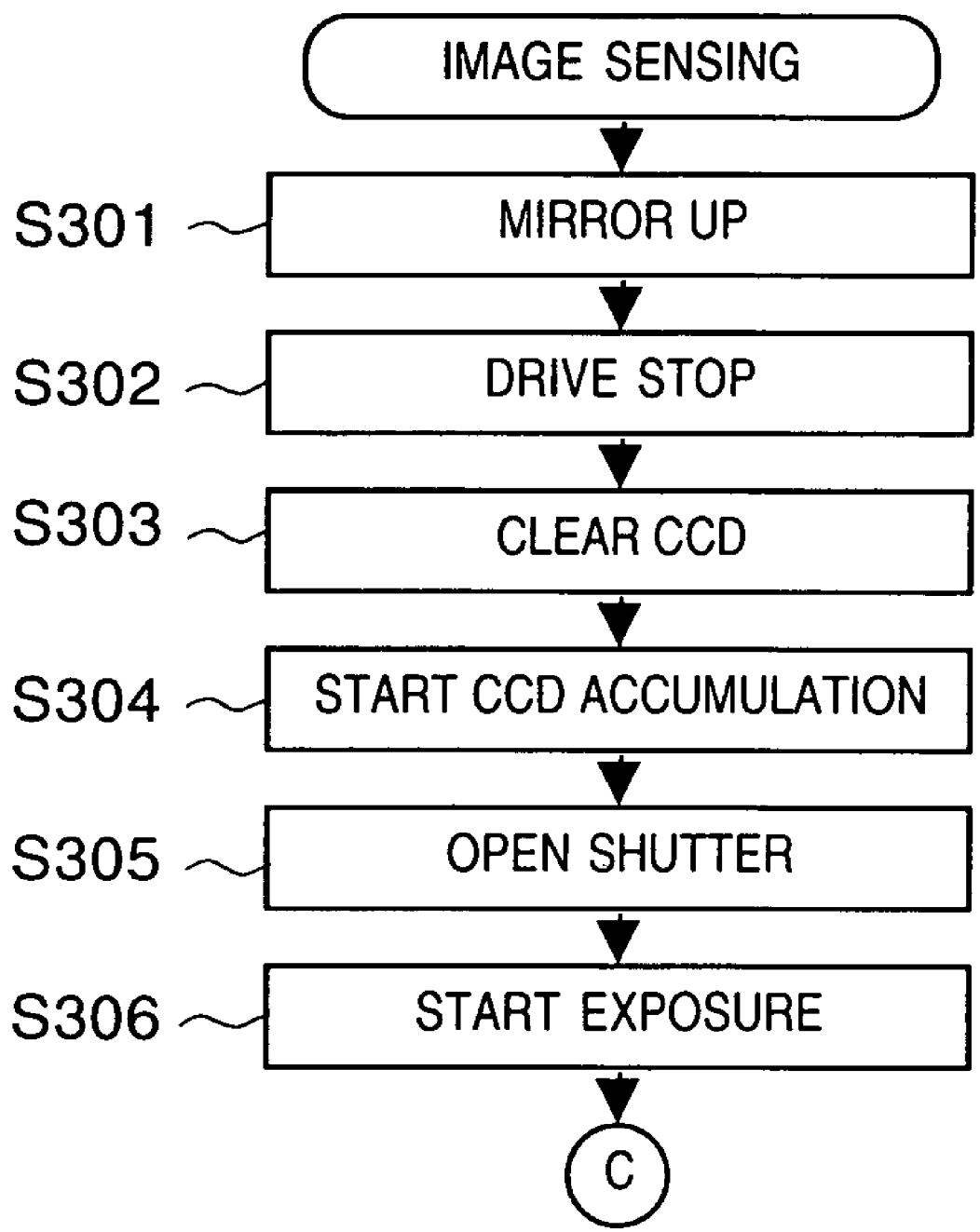
FIG. 6 is a flow chart showing the image sensing process sequence in step S129.
Figure 7:
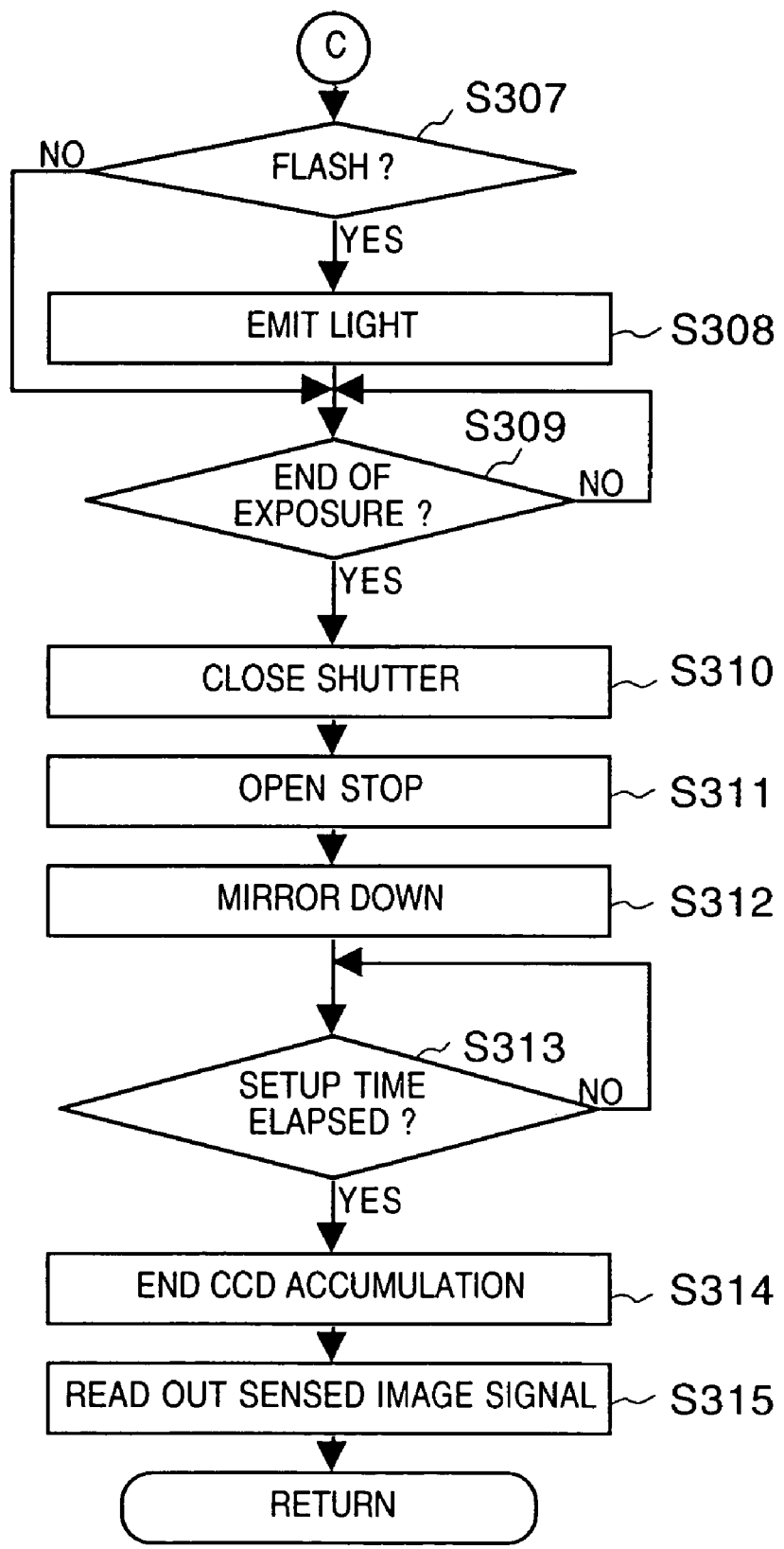
FIG. 7 is a flow chart showing the image sensing process sequence in step S129 and continued from FIG. 6.

FIGS. 6 and 7 are flow charts showing the image sensing process sequence in step S129. In this image sensing process, the system control circuit 50 and the stop control circuit 340 or distance measurement control circuit 342 exchange various signals via the interface 120, connectors 122 and 322, interface 320, and lens system control circuit 350.

The system control circuit 50 moves the mirror 130 to a mirror up position using a mirror driving unit (not shown) (step S301), and drives the stop 312 to a predetermined aperture value by the stop control circuit 340 in accordance with photometry data stored in its internal memory or the memory 52 (step S302).

The system control circuit 50 clears charge on the image sensing element 14 (step S303), then starts charge accumulation of the image sensing element 14 (step S304), opens the shutter 12 by the shutter control circuit 40 (step S305), and starts exposure of the image sensing element 14 (step S306).

The system control circuit 50 checks based on the flash flag if the electronic flash 48 is required (step S307), and if the electronic flash 48 is required, the circuit 50 controls the electronic flash 48 to emit light (step S308).

The system control circuit 50 waits for the end of exposure of the image sensing element 14 in accordance with the photometry data (step S309) Upon completion of exposure, the system control circuit 50 closes the shutter 12 by the shutter control circuit 40 (step S310), and ends exposure of the image sensing element 14.

The system control circuit 50 drives the stop 312 to a full-open aperture value by the stop control circuit 340 (step S311), and moves the mirror 130 to a mirror down position by the mirror driving unit (not shown) (step S312).

The system control circuit 50 checks if the determined charge accumulation time has elapsed (step S313). If the determined charge accumulation time has elapsed, the system control circuit 50 ends charge accumulation of the image sensing element 14 (step S314), then reads out a charge signal from the image sensing element 14, and writes sensed image data in a predetermined area of the memory 30 via the A/D converter 16, image processing circuit 20, and memory control circuit 22, or from the A/D converter 16 directly via the memory control circuit 22 (step S315). Upon completion of a series of processes, this process ends, and the flow returns to the main routine.

Figure 8:
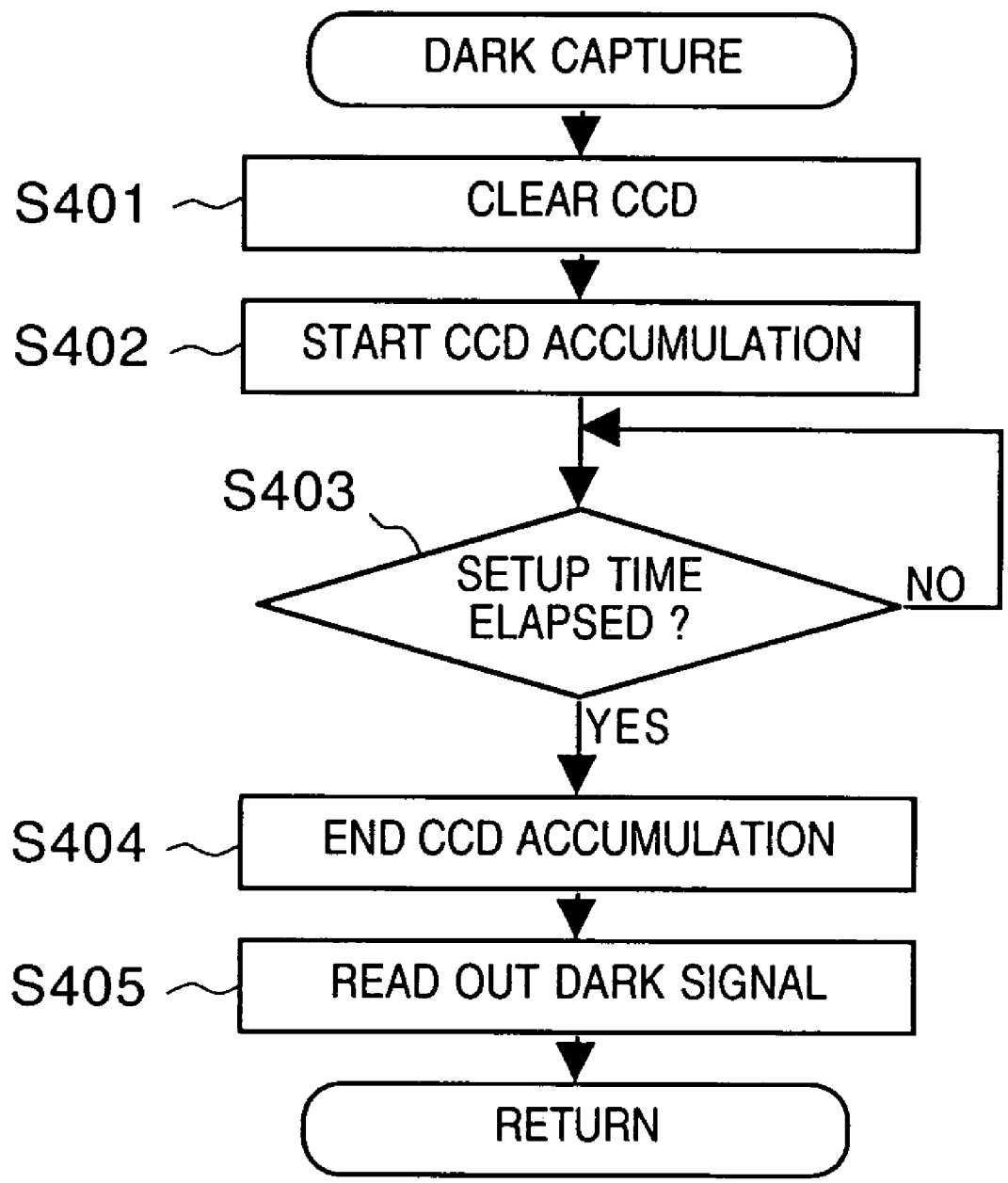
FIG. 8 is a flow chart showing the dark capture process sequence in steps S122 and S134.

FIG. 8 is a flow chart showing the dark capture process in steps S122 and S134. After the system control circuit 50 clears charge on the image sensing element 14 (step S401), it starts charge accumulation of the image sensing element 14 while the shutter 12 is closed (step S402).

The system control circuit 50 checks if a predetermined charge accumulation time has elapsed (step S403). If the charge accumulation time has elapsed, the system control circuit 50 ends charge accumulation of the image sensing element 14 (step S404), then reads out a charge signal from the image sensing element 14, and writes image data (dark image data) in a predetermined area of the memory 30 via the A/D converter 16, image processing circuit 20, and memory control circuit 22, or from the A/D converter 16 directly via the memory control circuit 22 (step S405). After that, the process ends, and the flow returns to the main routine.

By executing the development process using this dark capture data, sensed image data can be corrected for image quality deterioration such as pixel omission or the like caused by dark current noise produced by the image sensing element 14 and scratches unique to the image sensing element 14.

Note that this dark image data is held on the predetermined area of the memory 30 until a new distance measurement/photometry process is done or the power switch of the image sensing apparatus 100 is turned off. This dark image data is used when the image sensing process is done later, and image data sensed by that process is read out to execute the development process. Or when image data sensed by the image sensing process and read out from the image sensing element 14 has already been written in the memory 30, the development process is executed using dark image data.

Figure 9:
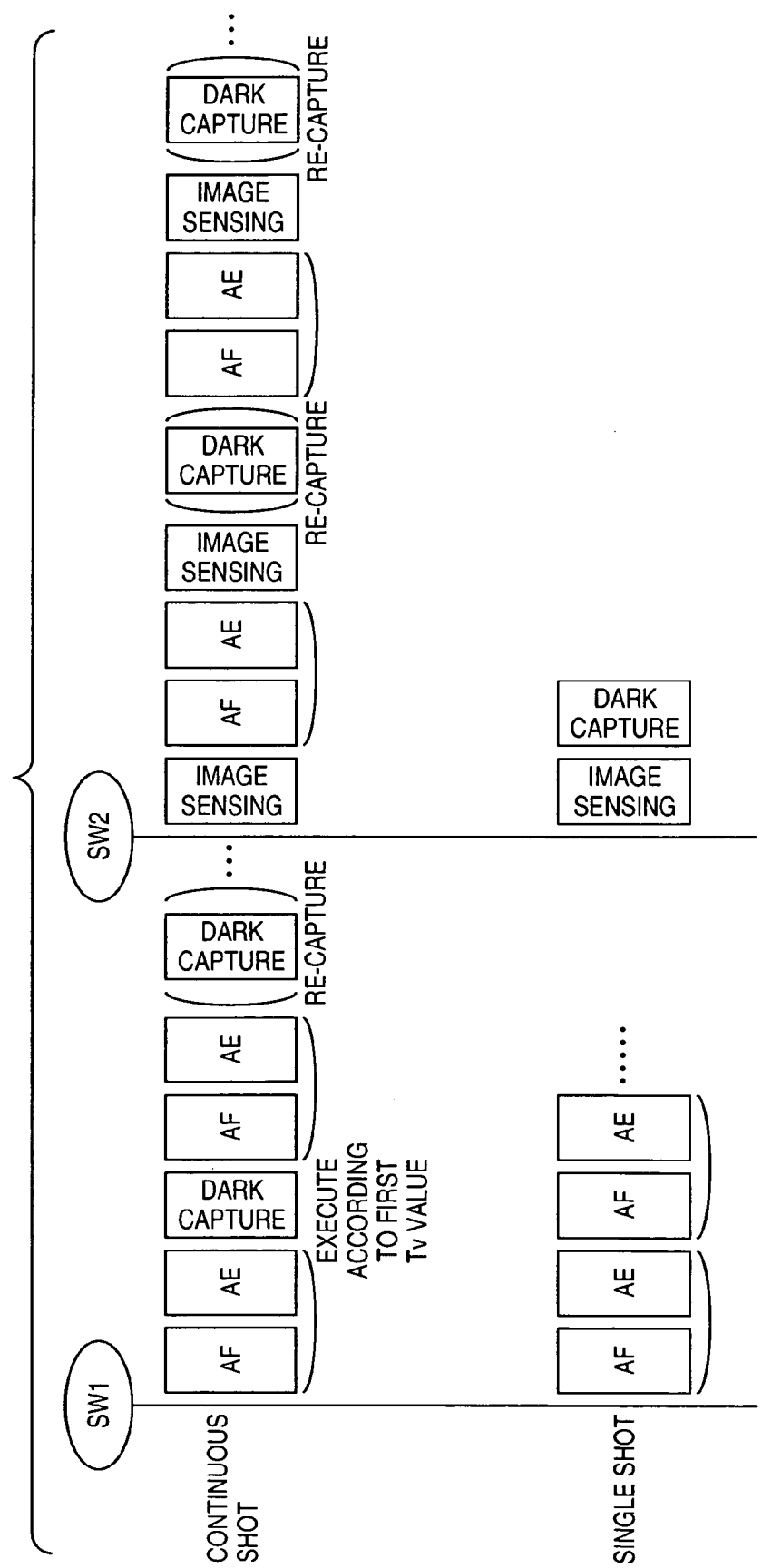
FIG. 9 is a timing chart showing the flow of image sensing operation in the first embodiment.
Figure 10:
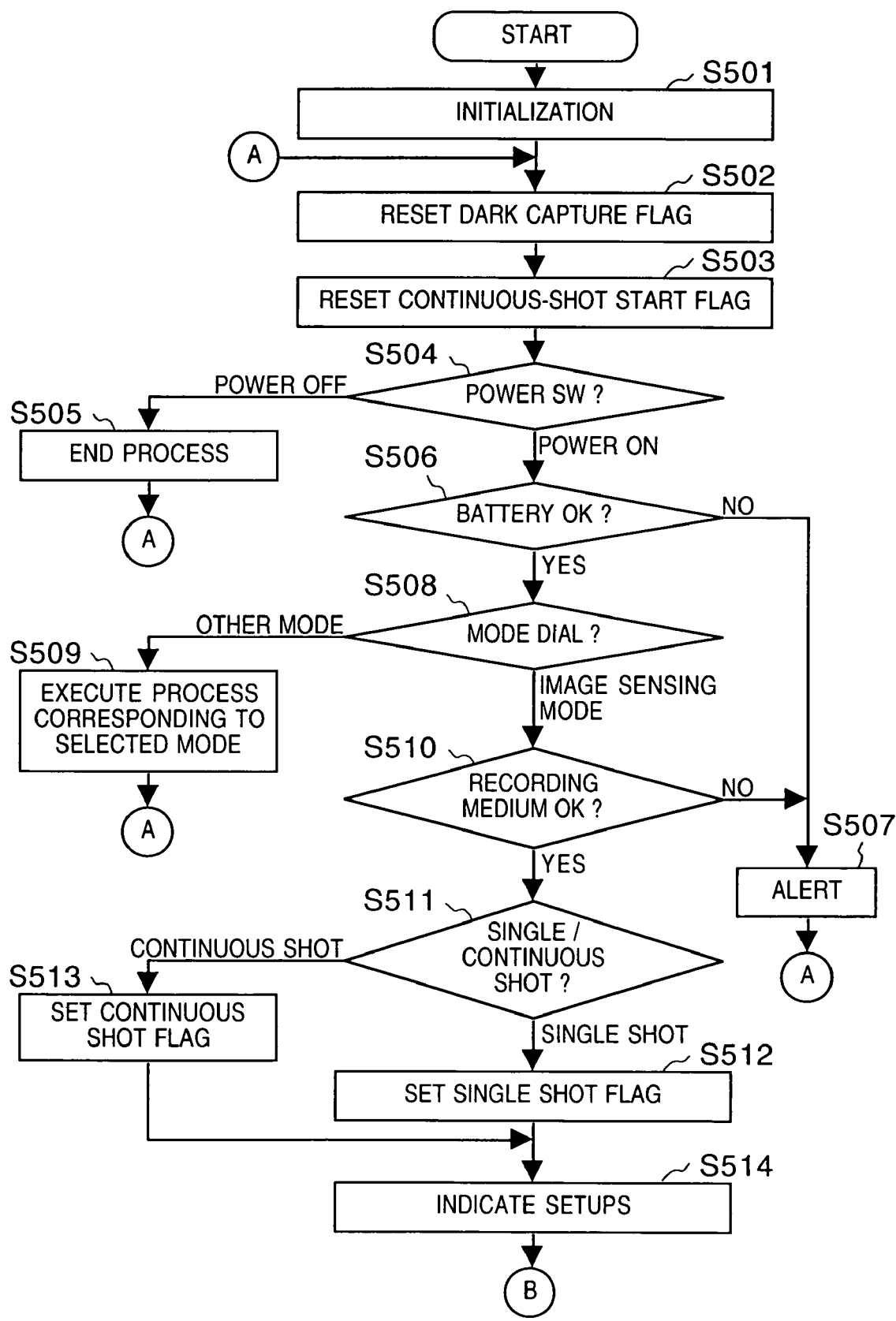
FIG. 10 is a flow chart showing the image sensing operation process sequence of an image sensing apparatus 100 according to the second embodiment of the present invention.
Figure 11:
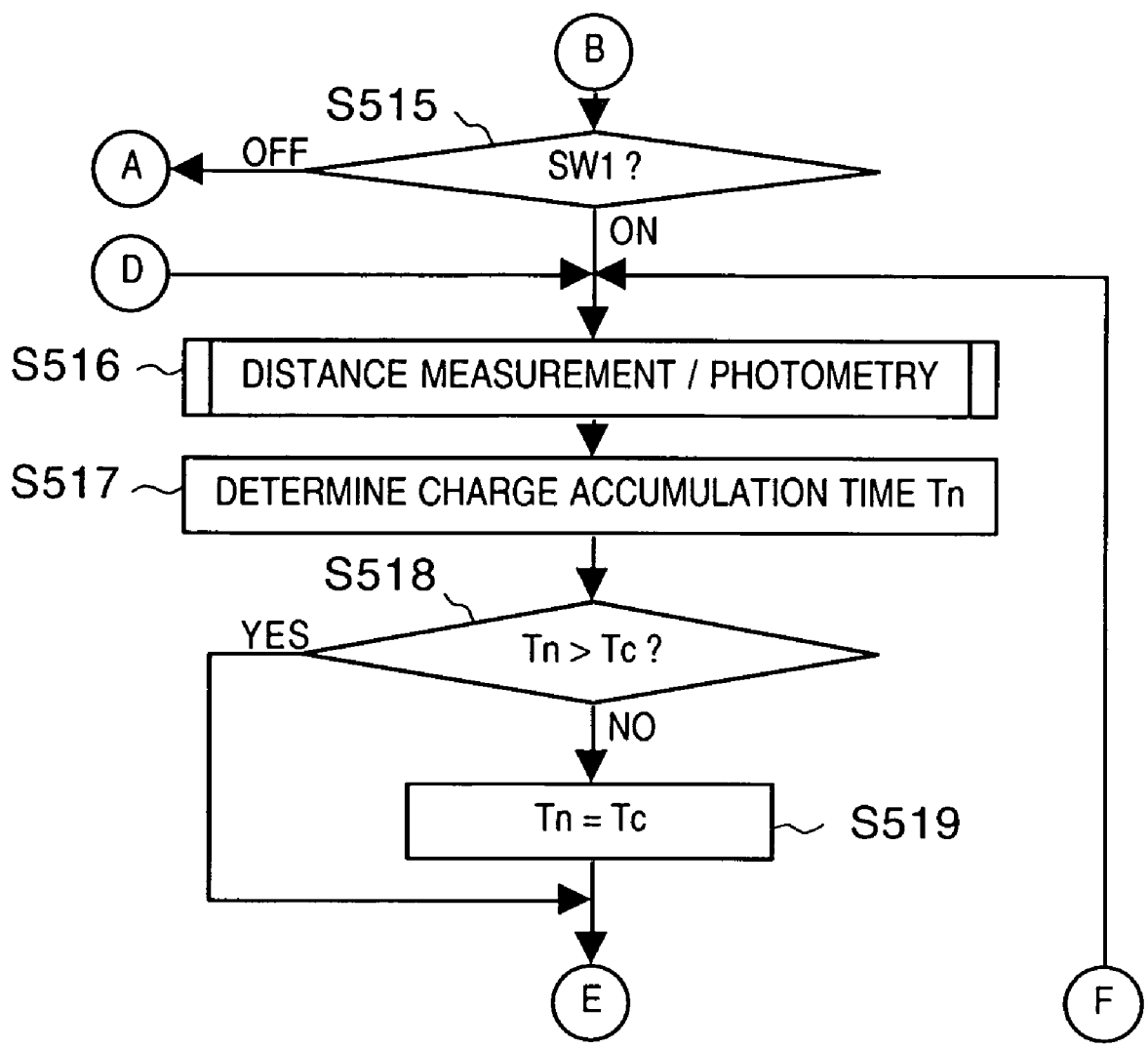
FIG. 11 is a flow chart showing the image sensing operation process sequence of the image sensing apparatus 100 and continued from FIG. 10.
Figure 12:
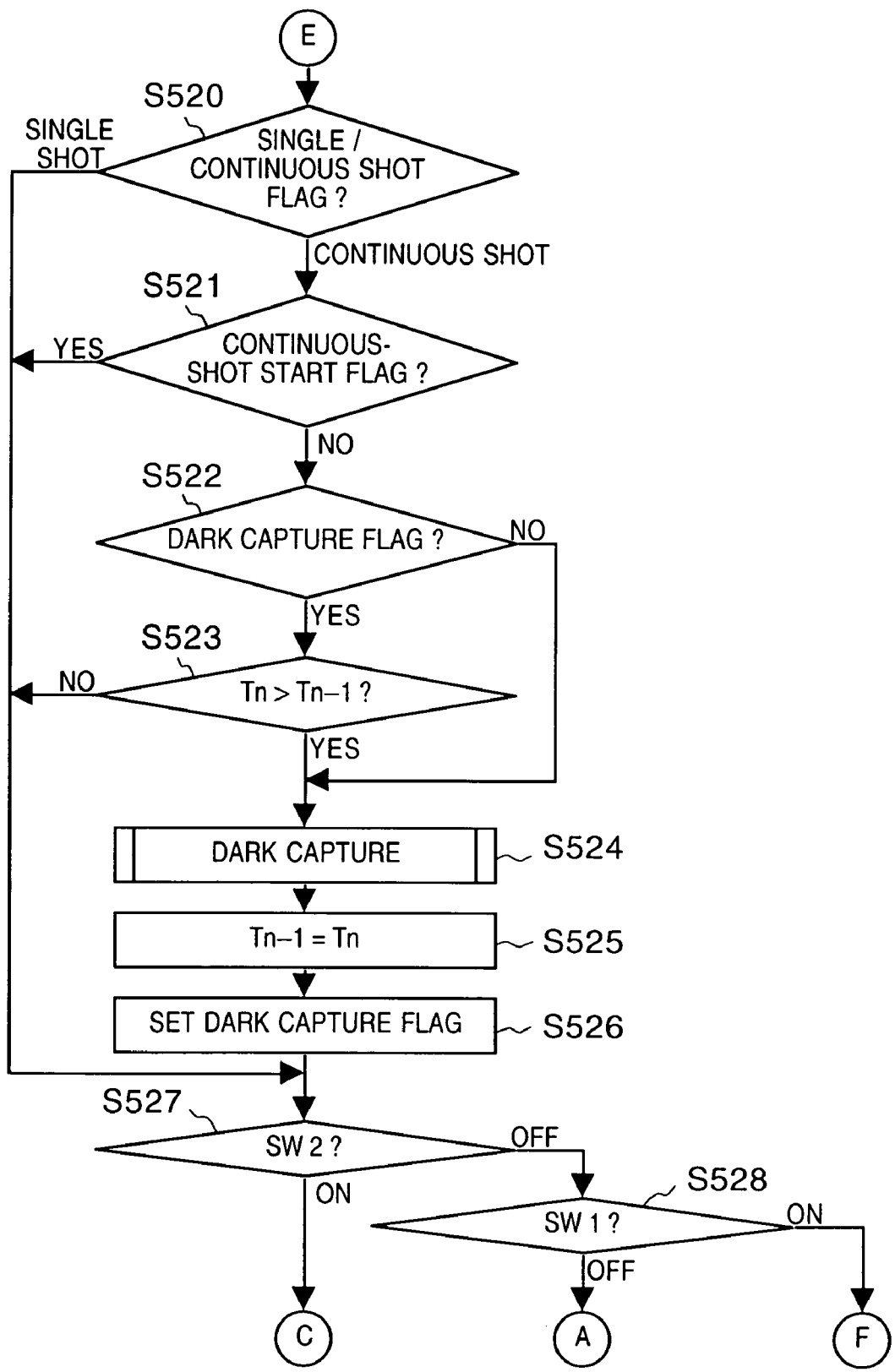
FIG. 12 is a flow chart showing the image sensing operation process sequence of the image sensing apparatus 100 and continued from FIGS. 10 and 11.
Figure 13:
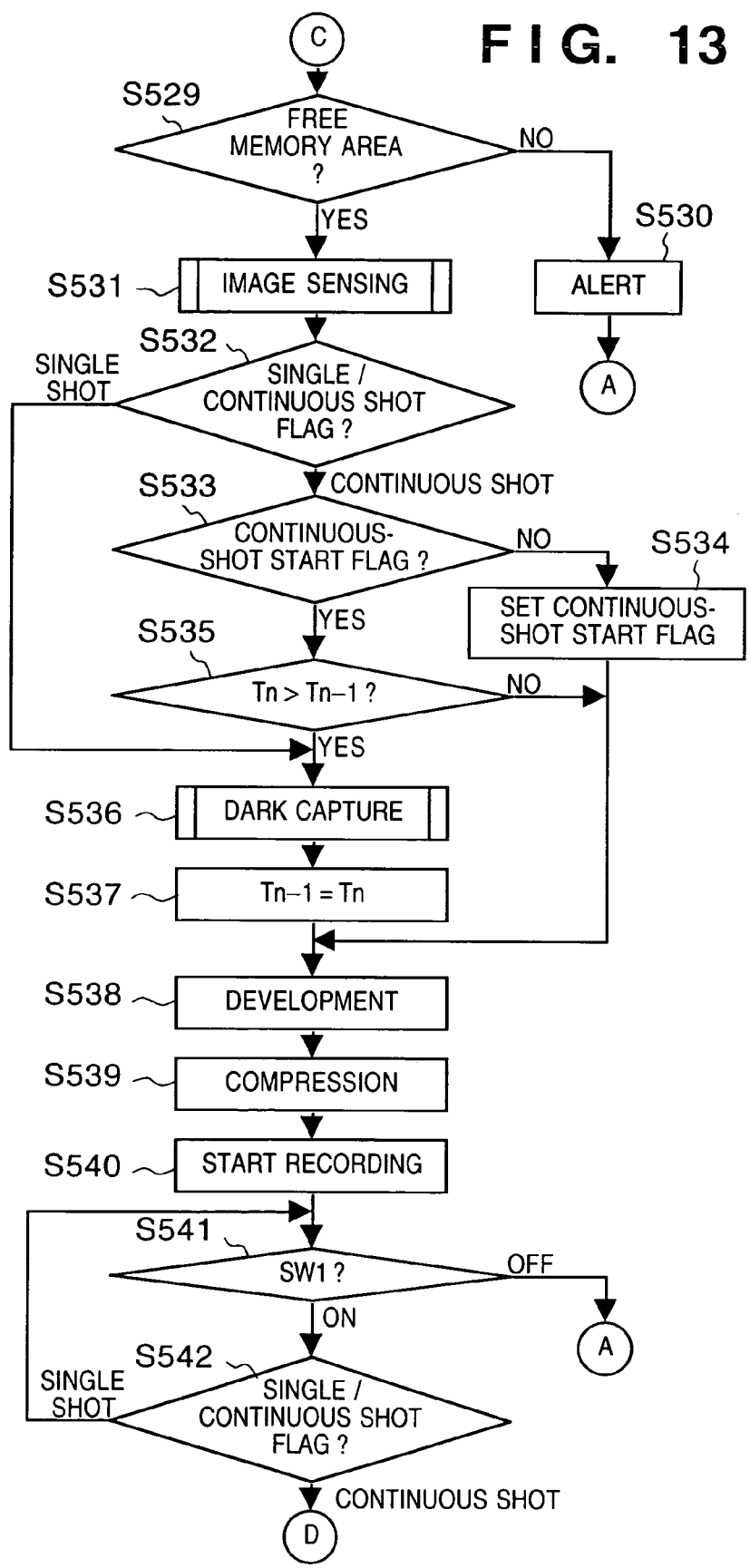
FIG. 13 is a flow chart showing the image sensing operation process sequence of the image sensing apparatus 100 and continued from FIGS. 10, 11, and 12.

FIG. 9 is a timing chart showing the flow of image sensing operation in this embodiment. As has been explained in detail above with reference to FIGS. 2 to 8, in the single shot mode, the AF and AE operations are repeated upon depression of the shutter switch SW1, until the shutter switch SW2 is turned on. Upon depression of the shutter switch SW2, the dark capture process is done after image sensing.

On the other hand, in the continuous shot mode, after the AF and AE operation and the dark capture process are done upon depression of the shutter switch SW1, the AF and AE operations are repeated until the shutter switch SW2 is turned on. At this time, if it is determined that the image sensing condition has changed due to a change in charge accumulation time Tn determined in correspondence with the shutter speed (Tv value), the dark capture process is redone. Upon depression of the shutter switch SW2, the image sensing process and AF and AE operations are continuously executed while the shutter switch SW2 is held ON. During these processes, if it is determined that the image sensing condition has changed due to a change in charge accumulation time Tn determined in correspondence with the shutter speed (Tv value), the dark capture process is redone.

Second Embodiment

Although an electronic camera of the second embodiment has the same hardware arrangement as that of the first embodiment, some steps of the image sensing operation process shown in FIGS. 2, 3, and 4 are different. The different image sensing operation process will be explained below.

FIGS. 10, 11, 12, and 13 are flow charts showing the image sensing operation process sequence of the image sensing apparatus 100 in the second embodiment. This processing program is stored in a storage medium such as the nonvolatile memory 56, is loaded onto the memory 52, and is executed by the CPU in the system control circuit 50, as in the first embodiment.

Upon power ON after battery exchange or the like, the system control circuit 50 initializes flags, control variables, and the like and also performs required predetermined initial setups in the respective units of the image sensing apparatus 100 (step S501). Furthermore, the system control circuit 50 resets a dark capture flag and continuous-shot start flag stored in its internal memory or the memory 52 (steps S502 and S503).

The system control circuit 50 checks the setup position of the power switch 72 to determine if the power switch 72 is set at the power-OFF position (step S504). If the power switch 72 is set at the power-OFF position, the system control circuit 50 executes a predetermined end process (step S505). More specifically, the system control circuit 50 changes the indications of the respective indication units to an end state, records required parameters and setup values including flags, control variables, and the like, and the currently selected mode in the nonvolatile memory 56, cuts off unnecessary power supply to the respective units of the image sensing apparatus 100 including the image display unit 28 by the power supply control circuit 80, and so forth. After that, the flow returns to step S502.

If the power switch 72 is set at the power-ON position, the system control circuit 50 checks using the power supply control circuit 80 if the remaining capacity and operation state of the power supply 86 comprising batteries and the like pose any problem in the operation of the image sensing apparatus 100 (step S506). If any problem is found, a predetermined alert indication is made by means of an image or voice using the indication unit 54 (step S507), and the flow then returns to step S502.

If it is determined that no problem is found in the power supply 86, the system control circuit 50 checks the setup position of the mode dial switch 60 to determine if the mode dial switch 60 is set at one of the image sensing mode positions (step S508). If the mode dial switch 60 is set at any of other mode positions, the system control circuit 50 executes a process corresponding to the selected mode (step S509), and the flow returns to step S502 upon completion of the process.

On the other hand, if the mode dial switch 60 is set at one of the image sensing mode positions, the system control circuit 50 checks if the recording medium 200 or 210 is attached, acquires management information of image data recorded on the recording medium 200 or 210, and then checks if the operation state of the recording medium 200 or 210 poses any problem in the operation of the image sensing apparatus 100, in particular, recording/playback of image data to/from the recording medium 200 or 210 (step S510). If any problem is found, a predetermined alert indication is made by means of an image or voice using the indication unit 54 (step S507), and the flow then returns to step S502.

If no problem is found in step S510, the system control circuit 50 checks the setup state of the single/continuous shot switch 68 that sets the single/continuous shot mode (step S511). If the single shot mode is selected, the circuit 50 sets a single/continuous shot flag to indicate the single shot mode (step S512); if the continuous shot mode is selected, the circuit 50 sets the single/continuous shot flag to indicate the continuous shot mode (step S513). With the single/continuous shot switch 68, the single shot mode for sensing one frame of image upon depression of the shutter switch SW2, and then setting a standby state, and the continuous shot mode for successively sensing images while the shutter switch SW2 is held down can be arbitrarily selectively set. Note that the state of the single/continuous shot flag is stored in the internal memory of the system control circuit 50 or the memory 52.

The system control circuit 50 indicates various setup states of the image display apparatus 100 by means of an image or voice using the indication unit 54 (step S514). When the image display of the image display unit 28 is ON, various setup states of the image display apparatus 100 are indicated by means of an image also using the image display unit 28.

The system control circuit 50 checks if the shutter switch SW1 is ON (step S515). If the shutter switch SW1 is OFF, the flow returns to step S502. On the other hand, if the shutter switch SW1 is ON, the system control circuit 50 executes a distance measurement/photometry process (step S516). More specifically, the system control circuit 50 executes a distance measurement process for bringing the photographing lens 310 into focus on an object, and also executes a photometry process to determine the aperture value and shutter speed. In the photometry process, the electronic flash is set if necessary. The distance measurement/photometry process is the same as that in the first embodiment.

The system control circuit 50 determines the aperture value (Av value) and shutter speed (Tv value) on the basis of the stored photometry data and/or setup parameters, and the image sensing mode selected by the mode dial switch 60, determines a charge accumulation time Tn in accordance with the determined shutter speed (Tv value), and stores the determined values in its internal memory or the memory 52 (step S517).

The system control circuit 50 checks if the new charge accumulation time Tn that was determined in step S517 and stored in its internal memory or the memory 52 is greater than a predetermined charge accumulation time Tc (step S518). If Tn>Tc, the flow jumps to step S520; if Tn≦Tc, Tn=Tc is set (step S519), and the flow advances to step S520.

In this manner, if the newly determined charge accumulation time Tn is equal to or shorter than the predetermined charge accumulation time Tc, the newly determined charge accumulation time Tn is replaced by the predetermined charge accumulation time Tc to execute a dark capture process using the predetermined charge accumulation time Tc.

With this control, if the new charge accumulation time falls within a range below the predetermined charge accumulation time Tc, the dark capture process need not be redone by frequently changing the charge accumulation time in correspondence with a change in exposure condition of an object. As a result, the shutter release time lag can be reduced, and nearly constant continuous shot frame intervals can be set upon continuous shot image sensing.

Since the dark capture process need not be frequently redone, electric power can be prevented from being wasted.

Note that the predetermined charge accumulation time Tc preferably uses, e.g., a charge accumulation time, which is used in image sensing and the dark capture process at a shutter speed faster than 1/60 sec. In this case, the predetermined charge accumulation time Tc assumes an appropriate value beyond 17 msec, e.g., 20 msec, 30 msec, or the like. The predetermined charge accumulation time may be another arbitrary value, or may have not one value but a plurality of values in given increments, and appropriate one of these values may be selected in correspondence with the operation mode or image sensing mode of the image sensing apparatus 100.

On the other hand, if the newly determined charge accumulation time Tn is longer than the predetermined charge accumulation time Tc, the newly determined charge accumulation time Tn is inhibited from being replaced by the predetermined charge accumulation time Tc. With this control, when a change in exposure state (change in image sensing condition) of an object beyond the predetermined charge accumulation time Tc has taken place, the dark capture process can be redone using the newly determined charge accumulation time.

Subsequently, the system control circuit 50 checks the state of the single/continuous shot flag stored in its internal memory or the memory 52 (step S520). If the single shot mode is set, the flow jumps to step S527 to check the state of the shutter switch SW2.

In this manner, if it is determined in step S520 that the single shot mode is selected, since the flow jumps to step S527 without executing a dark capture process in step S524 (to be described later), the release time lag upon depression of the shutter switch SW2 in step S527 can be reduced.

On the other hand, if it is determined in step S520 that the continuous shot mode is selected, the system control circuit 50 checks the state of the continuous-shot start flag stored in its internal memory or the memory 52 (step S521). If the continuous-shot start flag is set, the flow then jumps to step S527.

In this manner, if it is determined in step S521 that the continuous-shot start flag is set, since the flow jumps to step S527 without executing the dark capture process in step S524, the dark capture process is done as needed after the next frame of image is sensed in the process in step S531, once continuous shot image sensing has started.

With this process, during continuous shot image sensing, priority is given to image sensing timing over the dark capture process, and the shutter release time lag can be reduced.

On the other hand, if it is determined in step S521 that the continuous-shot start flag is reset, the system control circuit 50 checks the state of the dark capture flag stored in its internal memory or the memory 52 (step S522). If the dark capture flag is reset, the flow jumps to step S524.

On the other hand, if it is determined in step S522 that the dark capture flag is set, the system control circuit 50 checks if the new charge accumulation time Tn that was determined in step S517 and stored in its internal memory or the memory 52 is greater than the previous charge accumulation time Tn−1 (step S523). If Tn≦Tn−1, the flow jumps to step S527.

That is, if the newly determined charge accumulation time Tn is equal to or shorter than the previously used charge accumulation time Tn−1, since a dark image correction process can be done using the already captured dark image data in a development process in step S538, another dark capture process in step S524 is skipped.

On the other hand, if it is determined in step S523 that Tn>Tn−1, i.e., if the newly determined charge accumulation time Tn is longer than the previously used charge accumulation time Tn−1, the dark capture process is redone using the new charge accumulation time Tn (step S524). In the dark capture process, the system control circuit 50 accumulates noise components such as dark current and the like of the image sensing element 14 for the same period of time as that required for actual image sensing, while closing the shutter 12, and reads out the accumulated noise image signal.

By making correction computations using dark image data captured by the dark capture process, sensed image data can be corrected for image quality deterioration such as pixel omission or the like caused by dark current noise produced by the image sensing element 14 and scratches unique to the image sensing element 14. The dark capture process is the same as that in the first embodiment.

In this fashion, if the continuous shot mode is set in step S520, continuous shot image sensing has not started yet by pressing the shutter switch SW2, and no dark capture process is made after the shutter switch SW1 has been pressed, or if the dark capture process is made after the shutter switch SW1 has been pressed, but it is determined that the image sensing condition has changed due to a change in charge accumulation time Tn, and the dark capture process is redone, the dark capture process is executed prior to continuous shot image sensing, and nearly constant continuous shot frame intervals can be set, unless the dark capture process must be redone during continuous shot image sensing upon executing continuous shot image sensing by pressing the shutter switch SW2 in step S527.

Upon completion of the dark capture process in step S524, the system control circuit 50 updates Tn−1 by replacing it by Tn (Tn−1=Tn) so as to store the currently used charge accumulation time Tn as Tn−1 indicating the previously used charge accumulation time (step S525), and sets and stores the dark capture flag in its internal memory or the memory 52 (step S526).

The system control circuit 50 checks if the shutter switch SW2 is ON (step S527). If the shutter switch SW2 is OFF, the system control circuit 50 checks if the shutter switch SW1 is ON (step S528). If the shutter switch SW1 is ON, the flow returns to step S516 to repeat a series of processes. On the other hand, if the shutter switch SW1 is turned off in step S528, the flow returns to step S502.

On the other hand, if it is determined in step S527 that the shutter switch SW2 is turned on, the system control circuit 50 checks if an area that can store sensed image data is available on an image storage buffer area on the memory 30 (step S529). If no area that can store sensed image data is available on the image storage buffer area on the memory 30, a predetermined alert indication is made by means of an image or voice using the indication unit 54 (step S530), and the flow then returns to step S502.

For example, the user experiences such state immediately after he or she has executed continuous shot image sensing corresponding to a maximum number of images that can be stored in the image storage buffer area. In this state, the first image to be read out from the memory 30 and written in the recording medium 200 or 210 is not recorded on the recording medium 200 or 210 yet, and a free area even for one image cannot be assured on the image storage buffer area on the memory 30.

When sensed image data is stored in the image storage buffer area on the memory 30 after it is compressed, it is checked in step S529 if an area that can store sensed image data is available on the image storage buffer area on the memory 30, in consideration of the fact that the compressed image data size varies depending on the setups of the compression mode.

If an area that can store sensed image data is available on the image storage buffer area on the memory 30, the system control circuit 50 executes an image sensing process (step S531). More specifically, the system control circuit 50 reads out a sensed image signal, which has been accumulated for a predetermined period of time upon image sensing, from the image sensing element 14, and writes the sensed image data on the predetermined area of the memory 30 via the A/D converter 16, image processing circuit 20, and memory control circuit 22, or from the A/D converter directly via the memory control circuit 22. The image sensing process is the same as that in the first embodiment.

Upon completion of the image sensing process, the system control circuit 50 checks the state of the single/continuous shot flag stored in its internal memory or the memory 52 (step S532). As a result of checking the state of the single/continuous shot flag, if the single shot mode is selected, the system control circuit 50 executes a dark capture process (step S536).

In this manner, if it is determined in step S532 that the single shot mode is selected, the system control circuit 50 executes the dark capture process after the image sensing process, so as to reduce the release time lag upon depression of the shutter switch SW2.

On the other hand, as a result of checking the state of the single/continuous shot flag in step S532, if the continuous shot mode is selected, the system control circuit 50 checks the state of the continuous-shot start flag stored in its internal memory or the memory 52 (step S533).

If the continuous-shot start flag is reset, the system control circuit 50 sets the continuous-shot start flag (step S534).

In this manner, if the continuous-shot start flag is reset, since dark image data required for the development process in step S538 has already been captured in the dark capture process in step S524, the second frame of continuous shot image sensing is sensed without executing the dark capture process in step S536 after the first frame is sensed in step S531 upon starting continuous shot image sensing.

With this control, the continuous shot frame interval between the first and second frames upon continuous shot image sensing can be shortened, and the shutter release time lag for the second frame can be reduced.

On the other hand, if it is determined in step S533 that the continuous-shot start flag is set, the system control circuit 50 checks if the new charge accumulation time Tn that was determined in step S517 and stored in its internal memory or the memory 52 is greater than the previous charge accumulation time Tn−1 (step S535). If $Tn \leq Tn-1$, the flow jumps to step S538.

That is, if the newly determined charge accumulation time Tn is equal to or shorter than the previously used charge accumulation time Tn−1, since a dark image correction process can be done using the already captured dark image data in a development process in step S538, another dark capture process in step S536 is skipped.

In this manner, if the continuous shot mode is set in step S532, and the second and subsequent frames of continuous shot image sensing are sensed while the shutter switch SW2 is held ON, the shutter release time lag for the second and subsequent frames can be reduced unless the dark capture process must be redone. On the other hand, if it is determined in step S535 that Tn>Tn−1, i.e., if the newly determined charge accumulation time Tn is longer than the previously used charge accumulation time Tn−1, a new charge accumulation time Tn is set to redo the dark capture process in step S536.

That is, if the continuous shot mode is set in step S532, and the second and subsequent frames of continuous shot image sensing are sensed while the shutter switch SW2 is held ON, the dark capture process is done in step S536 only when the dark capture process has already been done but must be redone since it is determined that the image sensing condition has changed due to a change in charge accumulation time Tn.

In this way, when a constant exposure value of an object is maintained during continuous shot image sensing, the dark capture process need not be redone during continuous shot image sensing, and nearly constant continuous shot frame intervals can be set.

In step S536, the system control circuit 50 executes the dark capture process for accumulating noise components such as dark current and the like of the image sensing element 14 for the same period of time as that required for actual image sensing, while closing the shutter 12, and reading out the accumulated noise image signal.

By making correction computations using dark image data captured by the dark capture process, sensed image data can be corrected for image quality deterioration such as pixel omission or the like caused by dark current noise produced by the image sensing element 14 and scratches unique to the image sensing element 14. The dark capture process is the same as that in the first embodiment.

Upon completion of the dark capture process, the system control circuit 50 updates Tn−1 by replacing it by Tn (Tn−1=Tn) so as to store the currently used charge accumulation time Tn as Tn−1 indicating the previously used charge accumulation time (step S537).

The system control circuit 50 reads out some of image data written in the predetermined area of the memory 30 via the memory control circuit 22, executes a WB (white balance) integral computation process and OB (optical black) integral computation process required to execute development processes, and stores the computation results in its internal memory or the memory 52.

The system control circuit 50 then reads out sensed image data written in the predetermined area of the memory 30 using the memory control circuit 22 and the image processing circuit 20 as needed, and executes various development processes including AWB (auto white balance) process, gamma conversion, color conversion, and the like using the computation results stored in its internal memory or the memory 52 (step S538).

In the development processes in step S538, the system control circuit 50 also executes a dark correction computation process for canceling dark current noise and the like of the image sensing element 14 by executing a subtraction process using the dark image data captured in the dark capture process.

The system control circuit 50 reads out image data written in the predetermined area of the memory 30, makes the compression/expansion circuit 32 execute an image compression process in accordance with the selected mode, and writes the image data that has sensed and undergone a series of processes in a free image space of the image storage buffer area on the memory 30 (step S539).

Upon executing a series of processes, the system control circuit 50 starts a recording process for reading out image data stored in the image storage buffer area of the memory 30, and writing the readout image data in the recording medium 200 or 210 such as a memory card, compact flash card, or the like (step S540).

This recording process is started for new image data, which has been sensed and undergone a series of processes, every time that image data is written in a free image space of the image storage buffer area on the memory 30.

While a write of image data in the recording medium 200 or 210 is underway, a recording medium write access indication (e.g., flashing an LED of the indication unit 54) is made to clearly indicate that write access.

The system control circuit 50 then checks if the shutter switch SW1 is ON (step S541). If the shutter switch SW1 stays OFF, the flow returns to step S502. If the shutter switch SW1 is ON, the system control circuit 50 checks the state of the single/continuous shot flag stored in its internal memory or the memory 52 (step S542), and if the single shot mode is selected, the flow returns to step S541 to repeat the current process until the shutter switch SW1 is turned off.

If the continuous shot mode is selected, the flow returns to step S516 to proceed with image sensing, thus repeating a series of processes.

In the second embodiment, the predetermined charge accumulation time Tc preferably uses, e.g., a charge accumulation time, which is used in image sensing and the dark capture process at a shutter speed faster than 1/60 sec. In this case, the predetermined charge accumulation time Tc assumes an appropriate value beyond 17 msec, e.g., 20 msec, 30 msec, or the like.

The predetermined charge accumulation time Tc may be another arbitrary value, or may have not one value but a plurality of values in given increments, and appropriate one of these values may be selected in correspondence with the operation mode or image sensing mode of the image sensing apparatus 100.

The predetermined charge accumulation time Tc may be selected to be an appropriate value in accordance with the characteristics of the lens unit 300 attached. For example, since the camera-shake limit shutter speed changes depending on the focal length and the presence/absence of an anti-vibration function of the lens unit attached, the predetermined charge accumulation time Tc may be set accordingly.

In this manner, the predetermined charge accumulation time Tc may be set to be equal to or longer than a time corresponding to a shutter speed capable of image sensing without causing any camera shake. Or the predetermined charge accumulation time Tc may be set to be equal to or longer than 1/60 sec. Furthermore, the predetermined charge accumulation time Tc may be set to be equal to or longer than a time corresponding to the shutter speed that can be synchronized with a flash.

In the above embodiments, the single or continuous shot mode is selected using the single/continuous shot switch 68. Alternatively, the single or continuous shot mode may be selected in correspondence with the operation mode selected by the mode dial switch 60.

In the above embodiments, the charge accumulation time of the actual image sensing process is set to be equal to that of the dark capture process. However, different charge accumulation times may be set as long as sufficient data that can be used to correct dark current noise and the like can be obtained.

During execution of the dark capture process in step S122 or S134 or step S524 or S536, since image sensing cannot be done, a visual or audio message indicating that the image sensing apparatus 100 is busy may be output using the indication unit 54 and/or image display unit 28.

In the above embodiments, image sensing is done by moving the mirror 130 between the mirror up and down positions. However, the mirror 130 may comprise a half mirror, and image sensing may be done without moving the mirror.

Furthermore, the recording media 200 and 210 are not limited to memory cards such as PCMCIA cards, compact flash cards, or the like, hard disks, and the like, but may use micro DATs, magnetooptical disks, optical disks such as CD-Rs, CD-WRs, or the like, phase change optical disks such as DVDs, and the like. Also, the recording media 200 and 210 may use hybrid media that integrate memory cards, hard disks, and the like. Moreover, such hybrid media may include detachable media.

In the above embodiments, the recording media 200 and 210 are independent from the image sensing apparatus 100 and are arbitrarily connectable. One or both the recording media 200 and 210 may be permanently connected to the image sensing apparatus 100.

An arbitrary number (one or a plurality) of image recording media 200 or 210 may be connectable to the image sensing apparatus 100.

In the above embodiments, the present invention is applied to an electronic camera that senses still images, but may be applied to a digital video camera or the like that senses a moving image.

In the above embodiments, the charge accumulation time Tn is determined after completion of the distance measurement/photometry process, and the dark capture process is done. However, when the predetermined charge accumulation time Tc is used, since the control need not wait for settlement of AE in the distance measurement/photometry process, the dark capture process may be started before completion of the distance measurement/photometry process. In this case, the AF and AE process operations, and the dark capture process operation may be simultaneously started, or the AF process operation and/or AE process operation may be started after the dark capture process operation is started.

Third Embodiment

Figure 14:
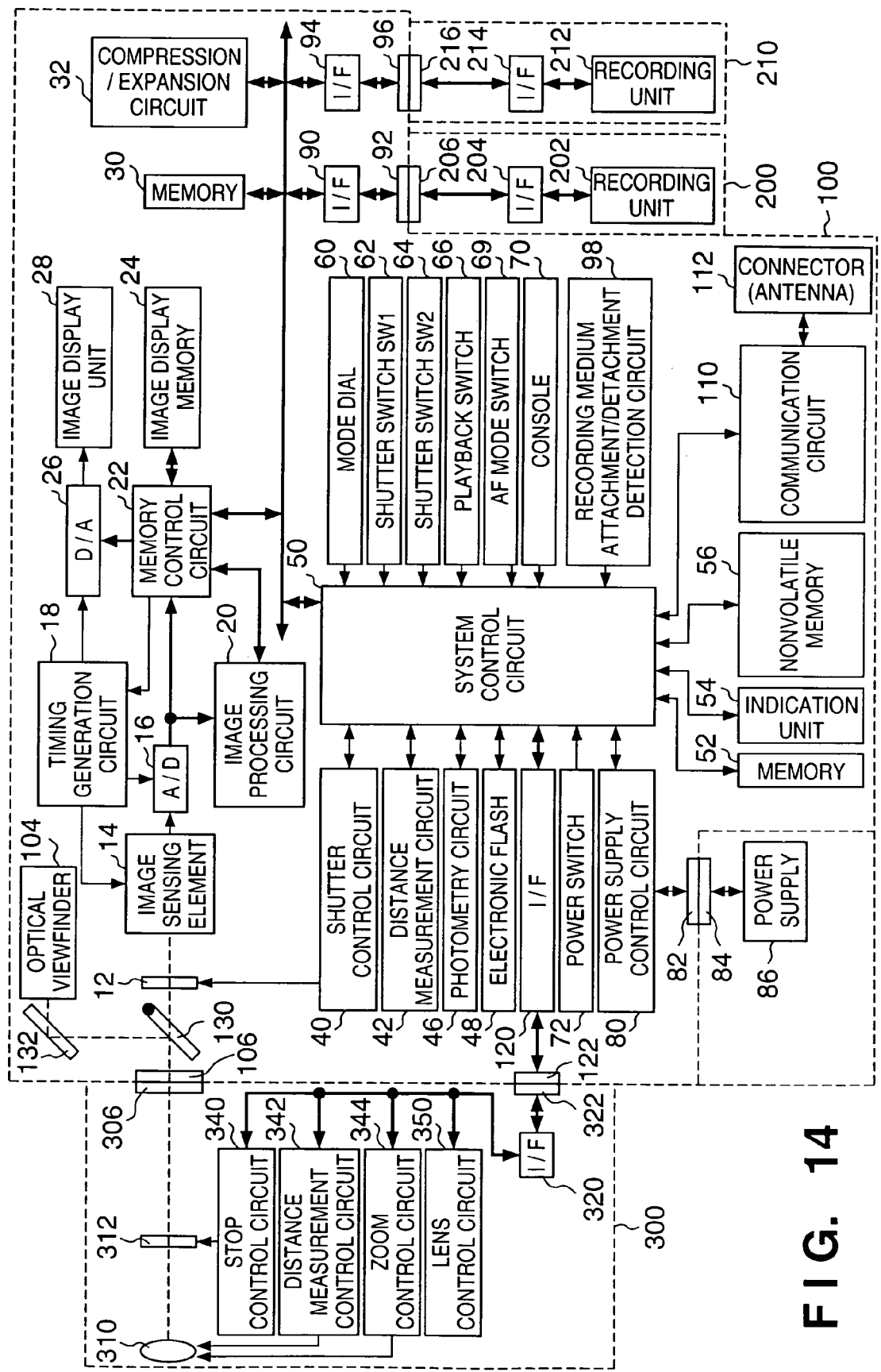
FIG. 14 is a block diagram showing the arrangement of an electronic camera according to the third embodiment of the present invention.

FIG. 14 is a block diagram showing the arrangement of an electronic camera according to the third embodiment of the present invention.

Referring to FIG. 14, the arrangement of the third embodiment comprises an AF mode switch 69 in place of the single/continuous shot switch 68 in the first embodiment.

The AF mode (setup) switch 69 can set one of a one-shot AF mode that starts AF operation after the shutter switch SW1 is turned on, and maintains a focusing state once an in-focus is attained, and a servo AF mode that continues AF operation while the shutter switch SW1 is held ON.

Reference numeral 70 denotes a console, including various buttons, touch panel, and the like, which include a single/continuous shot switch that can set one of a single shot mode for sensing one frame of image upon depression of the shutter switch SW2, and then setting a standby state, and a continuous shot mode for successively sensing images while the shutter switch SW2 is held ON, in addition to the operation members of the first embodiment.

The operation of the electronic camera with the arrangement of the third embodiment will be explained below.

Figure 15:
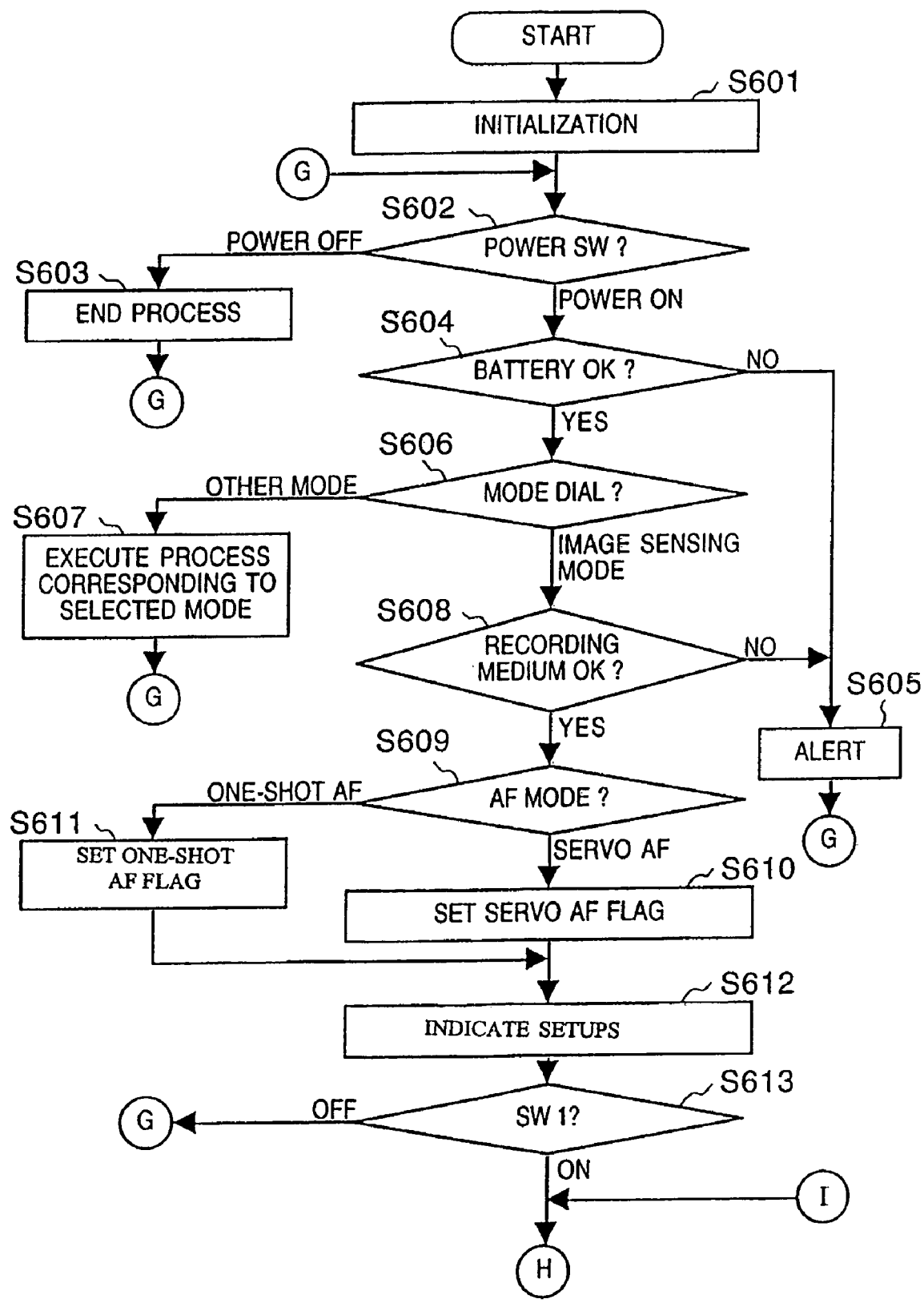
FIG. 15 is a flow chart showing the image sensing operation process sequence of an image sensing apparatus 100.
Figure 16:
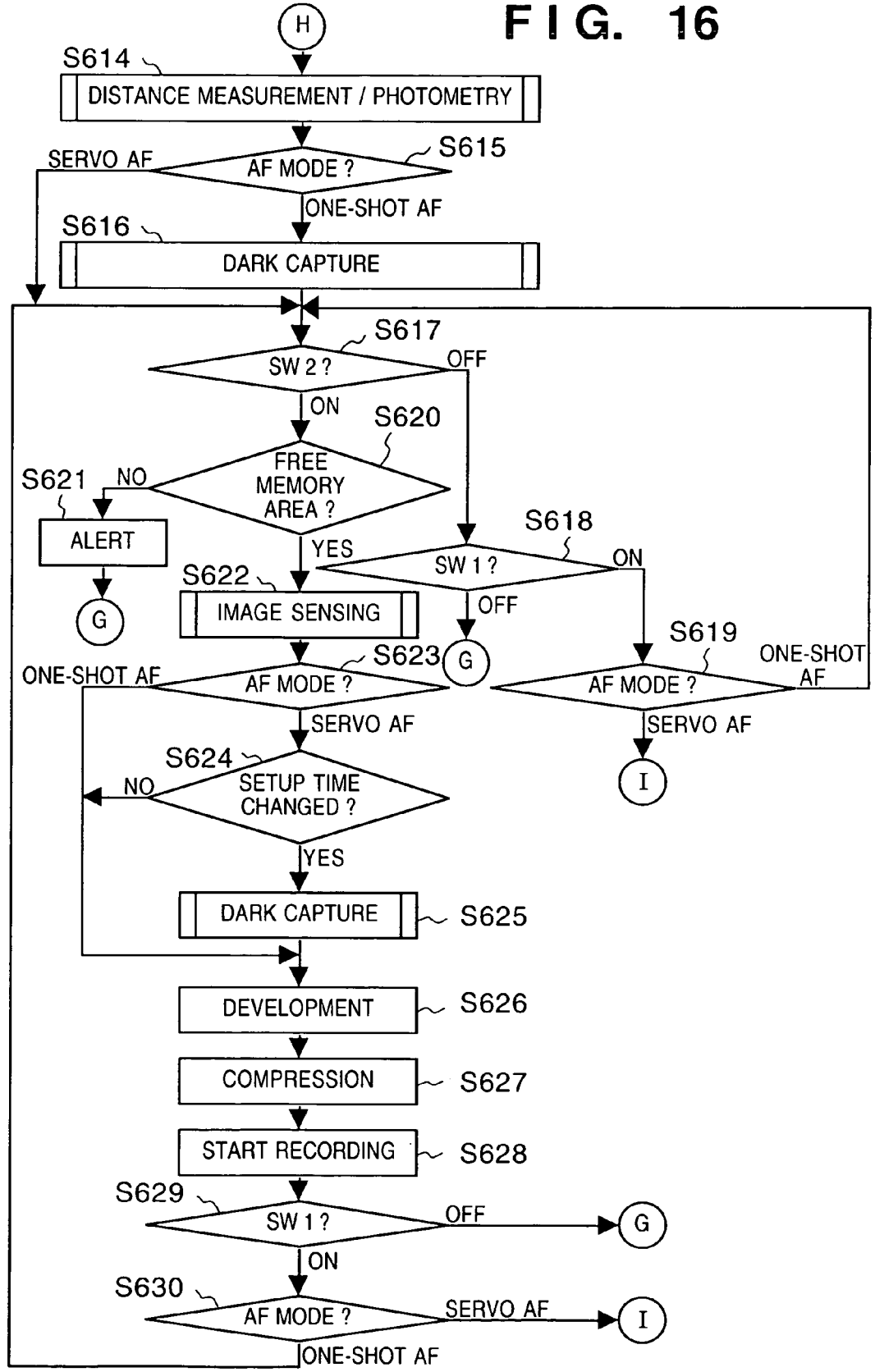
FIG. 16 is a flow chart showing the image sensing operation process sequence of the image sensing apparatus 100 and continued from FIG. 15.

FIGS. 15 and 16 are flow charts showing the image sensing operation process sequence of the image sensing apparatus 100. This processing program is stored in a storage medium such as the nonvolatile memory 56, is loaded onto the memory 52, and is executed by the CPU in the system control circuit 50.

Upon power ON after battery exchange or the like, the system control circuit 50 initializes flags, control variables, and the like and also performs required predetermined initial setups in the respective units of the image sensing apparatus 100 (step S601). The system control circuit 50 checks the setup position of the power switch 72 to determine if the power switch 72 is set at the power-OFF position (step S602).

If the power switch 72 is set at the power-OFF position, the system control circuit 50 executes a predetermined end process (step S603). More specifically, the system control circuit 50 changes the indications of the respective indication units to an end state, records required parameters and setup values including flags, control variables, and the like, and the currently selected mode in the nonvolatile memory 56, cuts off unnecessary power supply to the respective units of the image sensing apparatus 100 including the image display unit 28 by the power supply control circuit 80, and so forth. After that, the flow returns to step S602.

If the power switch 72 is set at the power-ON position, the system control circuit 50 checks using the power supply control circuit 80 if the remaining capacity and operation state of the power supply 86 comprising batteries and the like pose any problem in the operation of the image sensing apparatus 100 (step S604). If any problem is found, a predetermined alert indication is made by means of an image or voice using the indication unit 54 (step S605), and the flow then returns to step S602.

If no problem is found in the power supply 86, the system control circuit 50 checks the setup position of the mode dial switch 60 to determine if the mode dial switch 60 is set at one of the image sensing mode positions (step S606). If the mode dial switch 60 is set at any of other mode positions, the system control circuit 50 executes a process corresponding to the selected mode (step S607), and the flow returns to step S602 upon completion of the process.

On the other hand, if the mode dial switch 60 is set at one of the image sensing mode positions, the system control circuit 50 checks if the recording medium 200 or 210 is attached, acquires management information of image data recorded on the recording medium 200 or 210, and then checks if the operation state of the recording medium 200 or 210 poses any problem in the operation of the image sensing apparatus 100, in particular, recording/playback of image data to/from the recording medium 200 or 210 (step S608). If any problem is found, a predetermined alert indication is made by means of an image or voice using the indication unit 54 (step S605), and the flow then returns to step S602.

If no problem is found in step S608, the system control circuit 50 checks the setup state of the AF mode setup switch 69 (step S609). If the servo AF mode is selected, the circuit 50 sets an AF mode flag to indicate the servo AF mode (step S610); if the one-shot AF mode is selected, the circuit 50 sets the AF mode flag to indicate the one-shot AF mode (step S611).

The AF mode setup switch 69 can set one of a one-shot AF mode that starts AF operation after the shutter switch SW1 is turned on, and maintains a focusing state once an in-focus is attained, and a servo AF mode that continues AF operation while the shutter switch SW1 is held ON. The state of the AF mode flag is stored in the internal memory of the system control circuit 50 or the memory 52.

The system control circuit 50 indicates various setup states of the image display apparatus 100 by means of an image or voice using the indication unit 54 (step S612). When the image display of the image display unit 28 is ON, various setup states of the image display apparatus 100 are indicated by means of an image also using the image display unit 28.

The system control circuit 50 checks if the shutter switch SW1 is ON (step S613). If the shutter switch SW1 is OFF, the flow returns to step S602. On the other hand, if the shutter switch SW1 is ON, the system control circuit 50 executes a distance measurement/photometry process (step S614). More specifically, the system control circuit 50 executes a distance measurement process for bringing the photographing lens 310 into focus on an object, and also executes a photometry process to determine the aperture value and shutter speed. In the photometry process, the electronic flash is set if necessary. The details of the distance measurement/photometry process are the same as those in the flow chart shown in FIG. 5.

The system control circuit 50 checks the state of the AF mode flag stored in its internal memory or the memory 52 (step S615). If the servo AF mode is selected, the flow advances to step S617 without executing a dark capture process. With this control, the release time lag upon depression of the shutter switch SW2 in step S617 can be reduced.

On the other hand, if it is determined in step S615 that the one-shot AF mode is selected, the system control circuit 50 executes the dark capture process for accumulating noise components such as dark current and the like of the image sensing element 14 for the same period of time as that required for actual image sensing, while closing the shutter 12, and reading out the accumulated noise image signal (step S616).

By making correction computations (dark current noise correction process) using dark image data captured by the dark capture process, sensed image data can be corrected for image quality deterioration such as pixel omission or the like caused by dark current noise produced by the image sensing element 14 and scratches unique to the image sensing element 14. The details of the dark capture process are the same as those in the flow chart shown in FIG. 8.

In this manner, if it is determined in step S615 that the one-shot AF mode is selected, the dark capture process is done prior to continuous shot image sensing, thus setting nearly constant continuous shot frame intervals upon depression of the shutter switch SW2.

The system control circuit 50 checks if the shutter switch SW2 is ON (step S617). If the shutter switch SW2 is OFF, the system control circuit 50 checks if the shutter switch SW1 is turned off (step S618).

If the shutter switch SW1 is turned off, the flow returns to step S602.

On the other hand, if the shutter switch SW1 is ON, the system control circuit 50 checks the state of the AF mode flag stored in its internal memory or the memory 52 (step S619). If the one-shot AF mode is selected, the flow returns to step S617. In this way, when the one-shot AF mode is set, the current process is repeated until the shutter switch SW1 is turned off, or until the shutter switch SW2 is turned on in step S617.

On the other hand, if it is determined in step S619 that the servo AF mode is selected, the flow returns to step S614. In this manner, in the servo AF mode, the distance measurement/photometry process in step S614 is repeated until the shutter switch SW1 is turned off, or until the shutter switch SW2 is turned on in step S617.

On the other hand, if it is determined in step S617 that the shutter switch SW2 is turned on, the system control circuit 50 checks if an area that can store sensed image data is available on an image storage buffer area on the memory 30

(step S620). If no area that can store sensed image data is available on the image storage buffer area on the memory 30, a predetermined alert indication is made by means of an image or voice using the indication unit 54 (step S621), and the flow then returns to step S602.

For example, the user experiences such state immediately after he or she has executed continuous shot image sensing corresponding to a maximum number of images that can be stored in the image storage buffer area. In this state, the first image to be read out from the memory 30 and written in the recording medium 200 or 210 is not recorded on the recording medium 200 or 210 yet, and a free area even for one image cannot be assured on the image storage buffer area on the memory 30.

When sensed image data is stored in the image storage buffer area on the memory 30 after it is compressed, it is checked in step S620 if an area that can store sensed image data is available on the image storage buffer area on the memory 30, in consideration of the fact that the compressed image data size varies depending on the setups of the compression mode.

If it is determined in step S620 that an area that can store sensed image data is available on the image storage buffer area on the memory 30, the system control circuit 50 executes an image sensing process (step S622). More specifically, the system control circuit 50 reads out a sensed image signal, which has been accumulated for a predetermined period of time upon image sensing, from the image sensing element 14, and writes the sensed image data on the predetermined area of the memory 30 via the A/D converter 16, image processing circuit 20, and memory control circuit 22, or from the A/D converter directly via the memory control circuit 22. The details of the image sensing process are the same as those in the flow charts shown in FIGS. 6 and 7.

Upon completion of the image sensing process in step S622, the system control circuit 50 checks the state of the AF mode flag stored in its internal memory or the memory 52 (step S623). If the one-shot AF mode is selected, since the dark capture process has already been done in step S616 prior to continuous shot image sensing, the system control circuit 50 executes a development process in step S626. In this way, nearly constant continuous shot frame intervals can be set.

On the other hand, if the servo AF mode is selected, the system control circuit 50 checks if a setup time for charge accumulation in the dark capture process must be newly set or changed (step S624). If the setup time must be newly set or changed, the system control circuit 50 executes a dark capture process (step S625).

For example, when continuous shot image sensing has started in the servo AF mode, a new dark capture process must be done immediately after the first frame has been sensed. For this purpose, a new setup time used in step S403 in the dark capture process in FIG. 8 is set.

On the other hand, during continuous shot image sensing in the servo AF mode, if the exposure (AE) result detected in the photometry process in step S206 shown in FIG. 5 has changed, and the shutter speed (Tv value) has changed accordingly, the setup time used in step S403 in the dark capture process shown in FIG. 8 is changed as needed.

If it is determined in step S624 that a setup time need not be changed, the system control circuit 50 executes a development process in step S626 without capturing new dark image data. In this case, the development process is executed using the already captured dark image data.

The system control circuit 50 executes the dark capture process for accumulating noise components such as dark current and the like of the image sensing element 14 for the same period of time as that required for actual image sensing, while closing the shutter 12, and reading out the accumulated noise image signal (step S625). By making correction computations using dark image data captured by the dark capture process, sensed image data can be corrected for image quality deterioration such as pixel omission or the like caused by dark current noise produced by the image sensing element 14 and scratches unique to the image sensing element 14.

If it is determined in step S623 that the servo AF mode is selected, since the dark capture process is done after the image sensing process in step S622, the release time lag upon depression of the shutter switch SW2 in step S617 can be reduced.

The system control circuit 50 reads out some of image data written in the predetermined area of the memory 30 via the memory control circuit 22, executes a WB (white balance) integral computation process and OB (optical black) integral computation process required to execute development processes, and stores the computation results in its internal memory or the memory 52.

The system control circuit 50 then reads out sensed image data written in the predetermined area of the memory 30 using the memory control circuit 22 and the image processing circuit 20 as needed, and executes various development processes including AWB (auto white balance) process, gamma conversion, color conversion, and the like using the computation results stored in its internal memory or the memory 52 (step S626).

In the development processes, the system control circuit 50 also executes a dark correction computation process for canceling dark current noise and the like of the image sensing element 14 by executing a subtraction process using the dark image data captured in the dark capture process.

The system control circuit 50 reads out image data written in the predetermined area of the memory 30, makes the compression/expansion circuit 32 execute an image compression process in accordance with the selected mode, and writes the image data that has sensed and undergone a series of processes in a free image space of the image storage buffer area on the memory 30 (step S627).

The system control circuit 50 then starts a recording process for reading out image data stored in the image storage buffer area of the memory 30, and writing the readout image data in the recording medium 200 or 210 such as a memory card, compact flash card, or the like (step S628). This recording process is started for new image data, which has been sensed and undergone a series of processes, every time that image data is written in a free image space of the image storage buffer area on the memory 30.

While a write of image data in the recording medium 200 or 210 is underway, a recording medium write access indication (e.g., flashing an LED of the indication unit 54) is made to clearly indicate that write access.

The system control circuit 50 then checks if the shutter switch SW1 is ON (step S629). If the shutter switch SW1 stays OFF, the flow returns to step S602. If the shutter switch SW1 is ON, the system control circuit 50 checks the state of the AF mode flag stored in its internal memory or the memory 52 (step S630), and if the servo AF mode is selected, the flow returns to step S614 to sense the next image so as to proceed with image sensing while continuously executing AF and AE. On the other hand, if the one-shot AF mode is selected, the flow returns to step S617 to sense the next image, so as to proceed with image sensing without executing new AF and AE.

Figure 17:
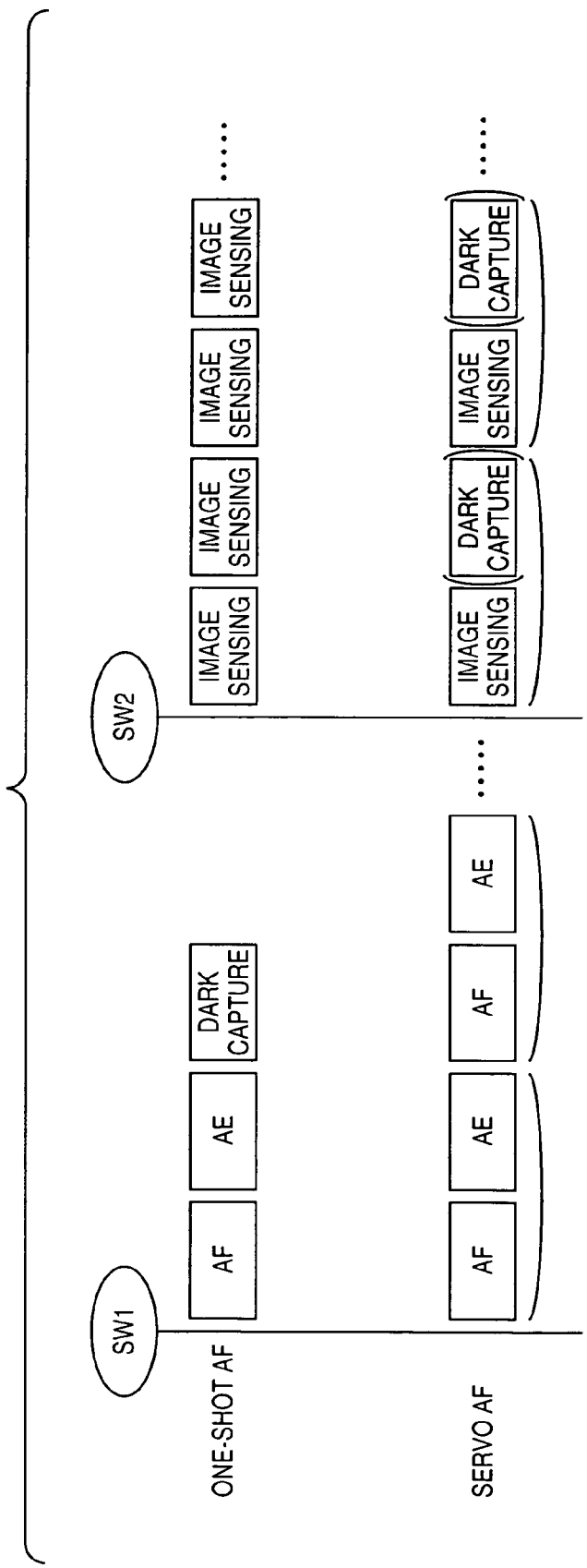
FIG. 17 is a timing chart showing the flow of the image sensing operation of the third embodiment.

FIG. 17 is a timing chart showing the flow of the image sensing operation of the third embodiment. As has already been described in detail above using FIGS. 5 to 8 and FIGS. 15 and 16, the servo AF mode repeats operations for repeating the AF and AE operations upon depression of the shutter switch SW1, and executing dark capture upon depression of the shutter switch SW2 after image sensing while the shutter switch SW2 is held down. On the other hand, in the one-shot AF mode, the AF and AE operations and the dark capture process are done upon depression of the shutter switch SW1, and images are successively sensed upon depression of the shutter switch SW2, while the shutter switch SW2 is held down.

In this embodiment, the AF mode setup switch 69 is used to switch the AF mode between the one-shot AF mode and servo AF mode. Alternatively, one of the one-shot AF mode and servo AF mode may be selected in accordance with the operation mode selected by the mode dial switch 60.

In the above embodiment, the charge accumulation time of the actual image sensing process is set to be equal to that of the dark capture process. However, different charge accumulation times may be set as long as sufficient data that can be used to correct dark current noise and the like can be obtained.

Furthermore, during execution of the dark capture process in step S616 or S625, since image sensing cannot be done, a visual or audio message indicating that the image sensing apparatus 100 is busy may be output using the indication unit 54 and/or image display unit 28.

In the above embodiment, image sensing is done by moving the mirror 130 between the mirror up and down positions. However, the mirror 130 may comprise a half mirror, and image sensing may be done without moving the mirror.

Furthermore, the recording media 200 and 210 are not limited to memory cards such as PCMCIA cards, compact flash cards, or the like, hard disks, and the like, but may use micro DATs, magnetooptical disks, optical disks such as CD-Rs, CD-WRs, or the like, phase change optical disks such as DVDs, and the like. Also, the recording media 200 and 210 may use hybrid media that integrate memory cards, hard disks, and the like. Moreover, such hybrid media may include detachable media.

In the above embodiment, the recording media 200 and 210 are independent from the image sensing apparatus 100 and are arbitrarily connectable. One or both the recording media 200 and 210 may be permanently connected to the image sensing apparatus 100.

An arbitrary number (one or a plurality) of image recording media 200 or 210 may be connectable to the image sensing apparatus 100.

In the above embodiment, the present invention is applied to an electronic camera that senses still images, but may be applied to a digital video camera or the like that senses a moving image.

Moreover, the present invention may be applied to either a system constituted by a plurality of devices, or an apparatus consisting of a single equipment. Also, the present invention may be applied to a case wherein the invention is achieved by supplying a program to a system or apparatus. In this case, by loading the contents of a storage medium that stores a program represented by software for implementing the present invention onto the system or apparatus, that system or apparatus can enjoy the effects of the present invention.

FIG. 18 shows the memory map of the nonvolatile memory 56 as a storage medium. The nonvolatile memory 56 comprising an EEPROM stores a main image sensing operation process program module shown in the flow charts in FIGS. 2, 3, and 4, a distance measurement/photometry process program module shown in the flow chart in FIG. 5, an image sensing process program module shown in the flow charts in FIGS. 6 and 7, a dark capture process program module shown in the flow chart in FIG. 8, a main image sensing operation process program module shown in the flow charts in FIGS. 10, 11, 12, and 13, and the like.

FIG. 19 shows the memory map of the nonvolatile memory 56 as a storage medium. The nonvolatile memory 56 comprising an EEPROM stores a main image sensing operation process program module shown in the flow charts in FIGS. 15 and 16, a distance measurement/photometry process program module shown in the flow chart in FIG. 5, an image sensing process program module shown in the flow charts in FIGS. 6 and 7, a dark capture process program module shown in the flow chart in FIG. 8, and the like.

The storage medium that supplies program modules is not limited to the ROM. For example, a floppy disk, hard disk, optical disk, magnetooptical disk, CD-ROM, CD-R, magnetic tape, nonvolatile memory card, ROM, and the like may be used.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The embodiments of the present invention have been described. However, the present invention is not limited to the arrangements of such embodiments, but may be applied to any other arrangements as long as they may achieve functions defined in the appended claims or functions of the arrangements of the embodiments.

For example, in each of the above embodiments, dark image data is captured before image sensing in the continuous shot mode. However, the present invention can be applied even when dark image data is captured after image sensing.

In each of the above embodiments, whether or not dark image data is captured is determined in the continuous shot mode or servo AF mode. However, the present invention can be applied even when such determination is made at any other timings, e.g., the single shot mode, one-shot AF mode, and the like.

The present invention is not limited to determination as to whether or not dark image data is captured in each of the above embodiments. For example, dark image data may be captured every time the image sensing time for capturing dark image data has changed.

The software and hardware arrangements of the above embodiments can be appropriately replaced.

The present invention may be achieved by combining the above embodiments or their technical components as needed.

The present invention may be applied even when all or some of claims or the arrangements of the embodiments form a single apparatus, are combined with another apparatus, or are building components of the apparatus.

The present invention can be applied to various types of cameras such as an electronic still camera, video movie camera, a camera using a silver halide film, and the like, image sensing apparatuses other than cameras, devices applied to such cameras and image sensing apparatuses, and building components of those devices.

As many apparently widely different embodiments of the present invention can be made without departing from the spirit and scope thereof, it is to be understood that the invention is not limited to the specific embodiments thereof except as defined in the appended claims.

What is claimed is:

1. An apparatus comprising:
   (A) an image sensing device; and
   (B) a signal processing device which performs a first image sensing operation for making said image sensing device perform an image sensing operation in an exposure state to obtain a sensed image signal, and a second image sensing operation for making said image sensing device perform an image sensing operation in a non-exposure state to obtain a sensed image signal, and processing the sensed image signal obtained by the first image sensing operation by the sensed image signal obtained by the second image sensing operation,
   wherein said signal processing device performs the second image sensing operation if it is determined that a charge accumulation time of the first image sensing operation is longer than a predetermined charge accumulation time and does not perform the second image sensing operation if it is not determined that the charge accumulation time of the first image sensing operation is longer than the predetermined charge accumulation time.

2. An apparatus comprising:
   (A) an image sensing device; and
   (B) a signal processing device which performs a first image sensing operation for making said image sensing device perform an image sensing operation in an exposure state to obtain a sensed image signal, and a second image sensing operation for making said image sensing device perform an image sensing operation in a non-exposure state to obtain a sensed image signal, and processing the sensed image signal obtained by the first image sensing operation by the sensed image signal obtained by the second image sensing operation,
   wherein said signal processing device does not perform the second image sensing operation if it is determined that a charge accumulation time of the first image sensing operation is shorter than a predetermined charge accumulation time and perform the second image sensing operation if it is not determined that the charge accumulation time of the first image sensing operation is shorter than the predetermined charge accumulation time.

3. An apparatus comprising:
   (A) an image sensing device; and
   (B) a signal processing device which performs a first image sensing operation for making said image sensing device perform an image sensing operation in an exposure state to obtain a sensed image signal, and a second image sensing operation for making said image sensing device perform an image sensing operation in a non-exposure state to obtain a sensed image signal, and processing the sensed image signal obtained by the first image sensing operation by the sensed image signal obtained by the second image sensing operation,
   wherein said signal processing device performs the second image sensing operation if it is determined that a charge accumulation time of the first image sensing operation is longer than a predetermined charge accumulation time and does not perform the second image sensing operation if it is determined that the charge accumulation time of the first image sensing operation is shorter than the predetermined charge accumulation time.

4. An apparatus comprising:
   (A) an image sensing device;
   (B) an operating device which is operable by an operator and sets the apparatus to a first operation state or a second operation state different from the first operation; and
   (C) a signal processing device which performs a first image sensing operation for making said image sensing device perform an image sensing operation in an exposure state to obtain a sensed image signal, and a second image sensing operation for making said image sensing device perform an image sensing operation in a non-exposure state to obtain a sensed image signal, and processing the sensed image signal obtained by the first image sensing operation by the sensed image signal obtained by the second image sensing operation,
   wherein when the first operation state is set, said signal processing device performs the second image sensing operation if it is determined that a charge accumulation time of the first image sensing operation is longer than a first charge accumulation time and does not perform the second image sensing operation if it is not determined that the charge accumulation time of the first image sensing operation is longer than the first charge accumulation time, and
   when the second operation state is set, said signal processing device performs the second image sensing operation if it is determined that a charge accumulation time of the first image sensing operation is longer than a second charge accumulation time and does not perform the second image sensing operation if it is not determined that the charge accumulation time of the first image sensing operation is longer than the second charge accumulation time, the first charge accumulation time being different from the second charge accumulation time.

5. An apparatus comprising:
   (A) an image sensing device;
   (B) an operating device which is operable by an operator and sets the apparatus to a first operation state or a second operation state different from the first operation; and
   (C) a signal processing device which performs a first image sensing operation for making said image sensing device perform an image sensing operation in an exposure state to obtain a sensed image signal, and a second image sensing operation for making said image sensing device perform an image sensing operation in a non-exposure state to obtain a sensed image signal, and processing the sensed image signal obtained by the first image sensing operation by the sensed image signal obtained by the second image sensing operation,
   wherein when the first operation state is set, said signal processing device does not perform the second image sensing operation if it is determined that a charge accumulation time of the first image sensing operation is shorter than a first charge accumulation time and perform the second image sensing operation if it is not determined that the charge accumulation time of the first image sensing operation is shorter than the first charge accumulation time, and
   when the second operation state is set, said signal processing device does not perform the second image sensing operation if it is determined that a charge accumulation time of the first image sensing operation is shorter than a second charge accumulation time and perform the second image sensing operation if it is not determined that the charge accumulation time of the first image sensing operation is shorter than the second charge accumulation time, the first charge accumulation time being different from the second charge accumulation time.

6. An apparatus comprising:
(A) an image sensing device;
(B) an operating device which is operable by an operator and sets the apparatus to a first operation state or a second operation state different from the first operation; and
(C) a signal processing device which performs a first image sensing operation for making said image sensing device perform an image sensing operation in an exposure state to obtain a sensed image signal, and a second image sensing operation for making said image sensing device perform an image sensing operation in a non-exposure state to obtain a sensed image signal, and processing the sensed image signal obtained by the first image sensing operation by the sensed image signal obtained by the second image sensing operation, wherein when the first operation state is set, said signal processing device performs the second image sensing operation if it is determined that a charge accumulation time of the first image sensing operation is longer than a first charge accumulation time and does not perform the second image sensing operation if it is determined that the charge accumulation time of the first image sensing operation is shorter than the first charge accumulation time and, when the second operation state is set, said signal processing device performs the second image sensing operation if it is determined that a charge accumulation time of the first image sensing operation is longer than a second charge accumulation time and does not perform the second image sensing operation if it is determined that the charge accumulation time of the first image sensing operation is shorter than the second charge accumulation time, the first charge accumulation time being different from the second charge accumulation time.

* * * * *